US011870707B2

(12) United States Patent
Wu

(10) Patent No.: US 11,870,707 B2
(45) Date of Patent: Jan. 9, 2024

(54) BANDWIDTH MANAGEMENT AND CONFIGURATION METHOD FOR CLOUD SERVICE, AND RELATED APPARATUS

(71) Applicant: Huawei Cloud Computing Technologies Co., Ltd., Guizhou (CN)

(72) Inventor: Xiaomin Wu, Gui'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/696,857

(22) Filed: Mar. 17, 2022

(65) Prior Publication Data

US 2022/0210091 A1 Jun. 30, 2022

Related U.S. Application Data

(63) Continuation of application No. PCT/CN2020/115715, filed on Sep. 17, 2020.

(30) Foreign Application Priority Data

Sep. 17, 2019 (CN) .......................... 201910877940.1
Jun. 17, 2020 (CN) .......................... 202010555777.X

(51) Int. Cl.
*H04L 47/783* (2022.01)
*H04L 47/2425* (2022.01)
(Continued)

(52) U.S. Cl.
CPC ........ *H04L 47/783* (2013.01); *H04L 47/2433* (2013.01); *H04L 47/805* (2013.01); *H04L 47/828* (2013.01)

(58) Field of Classification Search
CPC . H04L 47/783; H04L 47/2433; H04L 47/805; H04L 47/828; H04L 47/215;
(Continued)

(56) References Cited

U.S. PATENT DOCUMENTS

2010/0085874 A1  4/2010 Noy et al.
2011/0069634 A1  3/2011 Hajiaghayi et al.
(Continued)

FOREIGN PATENT DOCUMENTS

CN   1859207 A   11/2006
CN   103188086 A   7/2013
(Continued)

OTHER PUBLICATIONS

Steven S. W. Lee et al.,"A Traffic Meter Based on a Multicolor Marker for Bandwidth Guarantee and Priority Differentiation In SDN Virtual Networks",IEEE Transactions On Network and Service Management, vol. 16, No. 3, Sep. 2019, TOTAL 13 PAGES.

*Primary Examiner* — Michael Won
(74) *Attorney, Agent, or Firm* — Gregg Jansen

(57) ABSTRACT

A bandwidth management and configuration method for a cloud service is provided, the method including configuring a shared bandwidth package for a tenant of the cloud service, the at least two IP addresses sharing the shared bandwidth package, and the at least two IP addresses being configured by the tenant, and; configuring at least one sub-bandwidth package of the shared bandwidth package, the at least one sub-bandwidth package being bound to at least one IP address; performing rate limiting management on packet traffic based on the at least one sub-bandwidth package and the shared bandwidth package. On a premise that a bandwidth policy of the shared bandwidth package is met, different bandwidth policies may be independently set for different sub-bandwidth packages. In this way, rate limiting on selected traffic can be performed more finely and flexibly.

20 Claims, 18 Drawing Sheets

(51) Int. Cl.
*H04L 47/80* (2022.01)
*H04L 47/70* (2022.01)

(58) Field of Classification Search
CPC ............. H04L 41/0895; H04L 41/0806; H04L 41/0894; H04L 47/22; H04L 41/0896
See application file for complete search history.

(56) References Cited

U.S. PATENT DOCUMENTS

| | | |
|---|---|---|
| 2011/0310742 A1 | 12/2011 | Liu et al. |
| 2013/0117417 A1* | 5/2013 | Chen ................. H04L 47/74 709/219 |
| 2014/0201365 A1* | 7/2014 | Ashok ................ H04L 45/302 709/225 |
| 2016/0080206 A1 | 3/2016 | Prakash et al. |
| 2020/0136943 A1* | 4/2020 | Banyai ................ H04L 45/70 |
| 2020/0379808 A1* | 12/2020 | Eilert ................. G06F 12/023 |

FOREIGN PATENT DOCUMENTS

| | | |
|---|---|---|
| CN | 105050145 A | 11/2015 |
| CN | 105915387 A | 8/2016 |
| CN | 107666446 A | 2/2018 |
| CN | 109600818 A | 4/2019 |
| CN | 111585896 A | 8/2020 |
| EP | 2317701 A1 | 5/2011 |
| JP | 2001320418 A | 11/2001 |
| JP | 2014509474 A | 4/2014 |
| JP | 2016158080 A | 9/2016 |

\* cited by examiner

BANDWIDTH MANAGEMENT AND CONFIGURATION METHOD FOR CLOUD SERVICE, AND RELATED APPARATUS

CROSS-REFERENCE TO RELATED APPLICATIONS

This application is a continuation of International Application No. PCT/CN2020/115715, filed on Sep. 17, 2020, which claims priority to Chinese Patent Application No. 202010555777.X, filed on Jun. 17, 2020, and Chinese Patent Application No. 201910877940.1, filed on Sep. 17, 2019. All of the aforementioned applications are hereby incorporated by reference in their entireties.

TECHNICAL FIELD

This application relates to the field of cloud computing, and in particular, to a bandwidth management and configuration method for a cloud service, and a related apparatus.

BACKGROUND

When a tenant rents a device on a public cloud, and the public cloud device communicates with a server on a non-public cloud, interworking service packet traffic involves communication between the public cloud and the non-public cloud, and the public cloud device needs to occupy network bandwidth to implement communication with a non-public cloud device. Therefore, the tenant further needs to purchase the network bandwidth from a public cloud service provider, to implement communication between the public cloud device and the non-public cloud device within an agreed network bandwidth range. The network bandwidth is usually sold on the public cloud in a form of a bandwidth package.

For example, a virtual machine on the public cloud communicates with a server on the internet. In this case, the tenant needs to purchase an elastic internet protocol (EIP) address (elastic IP, which is referred to as EIP below) and a bandwidth package of the EIP. The EIP is bound to the virtual machine, and the virtual machine uses the EIP as a public IP address to communicate with the server on the internet. The bandwidth package records a bandwidth range applicable to traffic of the EIP. Traffic that exceeds the bandwidth range is discarded to limit a traffic rate.

When the tenant purchases a plurality of EIPs and binds the plurality of EIPs to a plurality of virtual machines, the plurality of EIPs may be set to a same bandwidth package to reduce traffic and costs. In this way, packet traffic between the plurality of virtual machines and the internet can share same network bandwidth without purchasing a plurality of bandwidth packages. The bandwidth package is sold in a form of a shared bandwidth package on the public cloud.

In addition, a corresponding shared bandwidth package may also be purchased to implement communication between a plurality of VPCs on the public cloud that are rented by the tenant and that are in different regions (region) or communication between the VPC and the non-public cloud device through a plurality of rented VPNs/private lines.

A current traffic rate limiting solution of the shared bandwidth package meets a basic rate limiting requirement. Generally, a same rate limiting policy is executed for all traffic in the shared bandwidth package. However, in an actual situation, when a plurality of types of traffic are concurrent, bandwidth contention occurs. For example, a packet in a type of traffic preempts a large amount of bandwidth in the shared bandwidth package. Consequently, other concurrent traffic may fail to obtain enough bandwidth, and therefore a service of the other traffic is affected.

SUMMARY

To resolve the foregoing problem, this application provides a bandwidth management and configuration method for a cloud service and a related apparatus. A sub-bandwidth package is set in a shared bandwidth package, so that rate limiting on selected traffic can be performed more finely and flexibly.

According to a first aspect, this application provides a bandwidth management method for a cloud service, including the following steps: configuring a shared bandwidth package for a tenant of the cloud service, where the tenant configures at least two IP addresses, the shared bandwidth package is bound to the at least two IP addresses, and the at least two IP addresses share the shared bandwidth package; configuring at least one sub-bandwidth package, where each sub-bandwidth package is bound to at least one IP address; and performing rate limiting management on packet traffic based on the at least one sub-bandwidth package and the shared bandwidth package.

The shared bandwidth package may be divided into a plurality of sub-bandwidth packages. On a premise that a bandwidth policy of the shared bandwidth package is met, different bandwidth policies may independently be set for different sub-bandwidth packages. For example, maximum bandwidth and minimum bandwidth of the sub-bandwidth package may be set. In this way, rate limiting on selected traffic can be performed more finely and flexibly, and other service traffic is not affected.

Optionally, the performing rate limiting management on packet traffic of the at least two IP addresses may include the following two cases: performing rate limiting management on packet traffic from the at least two IP addresses, and performing rate limiting management on packet traffic whose destination addresses are the at least two IP addresses.

Optionally, the cloud service is, for example, a service such as a virtual machine, a container, a bare metal server, a network address translation node, a load balancing node, or a gateway node that is provided by a public cloud for the tenant. The tenant may use the cloud service by paying a public cloud service provider.

In this application, traffic may be identified by using a source IP address or a destination IP address. Therefore, this application is applicable to uplink traffic and downlink traffic.

Optionally, different sub-bandwidth packages are bound to different IP addresses.

Different IP addresses correspond to different sub-bandwidth packages, and a sub-bandwidth package may be used to perform rate limiting management on a packet carrying a IP address.

Optionally, for packet traffic corresponding to each IP address, first-level rate limiting management is first performed based on a sub-bandwidth package bound to the IP address, and then second-level rate limiting management is performed based on the shared bandwidth package.

Two levels of rate limiting can implement precise rate limiting on a public cloud device used by the tenant.

Optionally, each sub-bandwidth package includes a peak parameter. In this case, the first-level rate limiting management includes the following steps: obtaining a first packet and a second packet, where IP addresses of the first packet and the second packet are bound to a first sub-bandwidth package; and based on a peak parameter of the first sub-bandwidth package, discarding the first packet and allowing the second packet to pass through, where a size of the first packet is greater than a first threshold, a size of the second packet is less than or equal to the first threshold, and the first threshold is determined based on the peak parameter of the first sub-bandwidth package.

Optionally, the peak parameter includes a peak rate and a peak size, and the first threshold is a quantity, of tokens in a first token bucket, that is determined based on a first peak rate and a first peak size. In this case, the first-level rate limiting management is implemented in the following manner: obtaining the first packet and the second packet, where the IP addresses of the first packet and the second packet are bound to a same sub-bandwidth package; discarding the first packet when the size of the first packet is greater than the quantity, of tokens in the first token bucket, that is determined based on the first peak rate and the first peak size; and allowing the second packet to pass through when the size of the second packet is less than or equal to the quantity of tokens in the first token bucket. The first peak size is a peak size of the sub-bandwidth package bound to the IP addresses of the first packet and the second packet.

A peak rate of the sub-bandwidth package may be set by the tenant. The peak size is determined based on the peak rate. First-level rate limiting is performed on a packet based on a quantity, of tokens in a token bucket, that is determined based on the peak rate and peak size, to ensure that a rate of the packet does not exceed the peak rate of the sub-bandwidth package.

Optionally, each sub-bandwidth package further includes an assurance parameter. Before the second packet is allowed to pass through, the method further includes the following step: adding a priority label to the second packet based on the size of the second packet. When the size of the second packet is less than or equal to a second threshold, a highest priority label is added to the second packet. When the size of the second packet is greater than the second threshold, a second highest priority label is added to the second packet. The second threshold is determined based on an assurance parameter of the first sub-bandwidth package.

Optionally, the assurance parameter includes an assurance rate and an assurance size, and the second threshold is a quantity, of tokens in a second token bucket, that is determined based on a first assurance rate and a first assurance size. Before the second packet is allowed to pass through, the priority label may further be added to the second packet based on the size of the second packet. When the size of the second packet is less than or equal to the quantity, of tokens in the second token bucket, that is determined based on the first assurance rate and the first assurance size, the highest priority label is added to the second packet. When the size of the second packet is greater than the quantity of tokens in the second token bucket, the second highest priority label is added to the second packet. The first assurance size is an assurance size of the sub-bandwidth package bound to the IP address of the second packet.

An assurance rate of the sub-bandwidth package may be set by the tenant. The assurance size is determined based on the assurance rate. A packet is labeled based on a quantity, of tokens in a token bucket, that is determined based on the assurance rate and the assurance size, to ensure a priority of the second-level rate limiting performed subsequently.

Optionally, the shared bandwidth package includes a first waterline and a second waterline. A quantity of tokens corresponding to the first waterline is greater than a quantity of tokens corresponding to the second waterline. The second-level rate limiting management includes the following step: performing rate limiting management based on a priority label of a packet, where a packet having the highest priority label obtains a token within a range of the first waterline, and a packet having the second highest priority label obtains a token within a range of the second waterline.

In a second-level rate limiting process, a waterline is used to determine quantities of tokens that can be obtained by packets having different priority labels. A bucket depth of a token bucket for a packet having a higher priority is larger, thereby ensuring that the packet having the higher priority can obtain more tokens than a packet having a lower priority.

Optionally, each sub-bandwidth package further includes priority information. The priority information of each sub-bandwidth package is used to indicate a contention priority, in the shared bandwidth package, of a packet corresponding to the IP address bound to the current sub-bandwidth package. The shared bandwidth package includes at least three waterlines. A first waterline corresponds to a largest quantity of tokens, and a third waterline corresponds to a smallest quantity of tokens. The second-level rate limiting management includes the following step: performing rate limiting management based on a priority label of a packet. A packet having the highest priority label obtains a token within a range of the first waterline. A packet having the second highest priority label and a high contention priority obtains a token within a range of the second waterline. A packet having the second highest priority label and a low contention priority obtains a token within a range of the third waterline.

In a second-level rate limiting process, a waterline is used to determine quantities of tokens that can be obtained by packets having different priority labels. A bucket depth of a token bucket for a packet having a higher priority is larger, thereby ensuring that the packet having the higher priority can obtain more tokens than a packet having a lower priority.

Optionally, the shared bandwidth package is bound to at least two public IP addresses. The at least two public IP addresses are purchased by the tenant from a control platform that provides the cloud service. The at least two EIP addresses are separately bound to one public cloud device purchased by the tenant from the control platform.

Optionally, a source IP address of the packet may be identified. When the source IP address is a first public IP address in the at least two public IP addresses, it is determined that the packet belongs to first traffic. When the source IP address is a second public IP address in the at least two public IP addresses, it is determined that the packet belongs to second traffic.

Optionally, a destination IP address of the packet may be identified. When the destination IP address is the first public IP address in the at least two public IP addresses, it is determined that the packet belongs to third traffic. When the destination IP address is the second public IP address in the at least two public IP addresses, it is determined that the packet belongs to fourth traffic.

Optionally, the public IP address is, for example, an EIP. The EIP may be bound to a public cloud device. The public cloud device is a device that provides the cloud service. Being bound to the EIP, the public cloud device can access the internet.

In an EIP scenario, according to this application, two levels of rate limiting may be performed on a public cloud device bound to different EIPs, to meet a requirement of a tenant of the public cloud device for precise rate limiting on packet traffic of an EIP.

Optionally, the at least two IP addresses are respectively IP addresses of at least two remote connection gateways, and the at least two remote connection gateways are disposed in a non-public cloud data center.

Optionally, a destination IP address of the packet may be identified. When the destination IP address is a first IP address in the IP addresses of the at least two remote connection gateways, it is determined that the packet belongs to fifth traffic. When the destination IP address is a second IP address in the IP addresses of the at least two remote connection gateways, it is determined that the packet belongs to sixth traffic.

Optionally, a source IP address of the packet may be identified. When the source IP address is the first IP address in the IP addresses of the at least two remote connection gateways, it is determined that the packet belongs to seventh traffic. When the source IP address is the second IP address in the IP addresses of the at least two remote connection gateways, it is determined that the packet belongs to eighth traffic.

In a hybrid cloud scenario, rate limiting may also be performed on traffic between a public cloud data center and the non-public cloud data center in the foregoing manner. Therefore, according to this application, a requirement of a tenant of a public cloud device for precise rate limiting on traffic across hybrid clouds may be met.

Optionally, the at least two IP addresses are respectively IP addresses of at least two remote connection gateways, and the at least two remote connection gateways are disposed in a remote public cloud data center.

On the public cloud, a local public cloud data center is connected to the remote public cloud data center through a backbone network, and traffic of the backbone network needs to be charged. According to this application, a requirement of a tenant of a public cloud device for precise rate limiting on traffic of a remote connection inside the public cloud may be met.

Optionally, the at least two IP addresses are respectively IP addresses of at least two remote connection gateways. One of the at least two remote connection gateways is disposed in a non-public cloud data center, and the other is disposed in a remote public cloud data center.

In this scenario, according to this application, a requirement of a tenant of a public cloud device for precise rate limiting on traffic of a remote connection inside the public cloud and traffic across hybrid clouds may be met.

Optionally, the at least two remote connection gateways are virtual private network VPN gateways, private line gateways, or a combination thereof.

According to a second aspect, this application provides a bandwidth configuration method for a cloud service, including the following steps: providing a shared bandwidth package configuration interface, where the shared bandwidth package configuration interface includes a first input box and a second input box, the first input box requires a tenant of the cloud service to enter at least two IP addresses bound to the shared bandwidth package, and the second input box requires the tenant to enter a size of the shared bandwidth package; providing a sub-bandwidth package configuration interface, where the sub-bandwidth package configuration interface includes at least one sub-bandwidth package configuration bar, each sub-bandwidth package configuration bar includes a third input box and a fourth input box, the third input box requires the tenant to enter at least one IP address bound to a current sub-bandwidth package, and the fourth input box requires the tenant to enter a size of the current sub-bandwidth package; and receiving configuration information entered by the tenant, and configuring the shared bandwidth package and the at least one sub-bandwidth package based on the configuration information.

The configuration interface is provided, so that the tenant can configure a sub-bandwidth package based on a requirement of the tenant, to perform rate limiting on different types of packet traffic. In this way, traffic of a public cloud device can be managed more finely and flexibly based on the requirement of the tenant.

Optionally, the fourth input box is used to receive a peak rate that is of the current sub-bandwidth package and that is configured by the tenant.

Optionally, the fourth input box is further used to receive an assurance rate that is of the current sub-bandwidth package and that is configured by the tenant.

Optionally, each sub-bandwidth package configuration bar further includes a fifth input box. The fifth input box is used to require the tenant to configure priority information of each sub-bandwidth package. The priority information of each sub-bandwidth package is used to indicate a contention priority, in the shared bandwidth package, of a packet corresponding to the IP address bound to the current sub-bandwidth package.

Optionally, the shared bandwidth package is bound to at least two elastic IP addresses EIPs. The at least two EIPs are purchased by the tenant from a control platform that provides the cloud service, and the at least two EIP addresses are separately bound to one public cloud device purchased by the tenant from the control platform.

Optionally, the at least two IP addresses are respectively IP addresses of at least two remote connection gateways, and the at least two remote connection gateways are disposed in a non-public cloud data center.

Optionally, the at least two IP addresses are respectively IP addresses of at least two remote connection gateways, and the at least two remote connection gateways are disposed in a remote public cloud data center.

Optionally, the at least two IP addresses are respectively IP addresses of at least two remote connection gateways. One of the at least two remote connection gateways is disposed in a non-public cloud data center, and the other is disposed in a remote public cloud data center.

Optionally, the at least two remote connection gateways are virtual private network VPN gateways, private line gateways, or a combination thereof.

According to a third aspect, this application provides a bandwidth management apparatus for a cloud service, including: a shared bandwidth package configuration module, configured to configure a shared bandwidth package for a tenant of the cloud service, where the shared bandwidth package is bound to at least two IP addresses, and the tenant accesses the internet by using the at least two IP addresses; a sub-bandwidth package configuration module, configured to configure at least one sub-bandwidth package, where each sub-bandwidth package is bound to at least one IP address; and a traffic management module, configured to perform rate limiting management on packet traffic of the at least two IP addresses based on the at least one sub-bandwidth package and the shared bandwidth package.

The third aspect is an apparatus implementation of the first aspect. Optional implementations of the first aspect and related technical effects may be applicable to the third aspect. Details are not described herein again.

According to a fourth aspect, this application provides a bandwidth configuration apparatus for a cloud service, including a configuration interface providing module that is configured to provide a shared bandwidth package configuration interface. The shared bandwidth package configuration interface includes a first input box and a second input box. The first input box requires a tenant of the cloud service to enter at least two IP addresses bound to the shared bandwidth package. The second input box requires the tenant to enter a size of the shared bandwidth package. The configuration interface providing module is further configured to provide a sub-bandwidth package configuration interface. The sub-bandwidth package configuration interface includes at least one sub-bandwidth package configuration bar. Each sub-bandwidth package configuration bar includes a third input box and a fourth input box. The third input box requires the tenant to enter at least one IP address bound to a current sub-bandwidth package, and the fourth input box requires the tenant to enter a size of the current sub-bandwidth package. The bandwidth configuration apparatus further includes a configuration module, configured to receive configuration information entered by the tenant, and configure the shared bandwidth package and the at least one sub-bandwidth package based on the configuration information.

The fourth aspect is an apparatus implementation of the second aspect. Optional implementations of the second aspect and related technical effects may be applicable to the fourth aspect. Details are not described herein again.

According to a fifth aspect, this application provides a rate limiting apparatus, including a network interface, a memory, and a processor. The memory stores an instruction, and the processor runs the program instruction to perform the method according to the first aspect and the optional implementations of the first aspect.

According to a sixth aspect, this application provides a control platform, including a network interface, a memory, and a processor. The memory stores a program instruction, and the processor runs the program instruction to perform the method according to the second aspect and the optional implementations of the second aspect.

According to a seventh aspect, this application provides a computer storage medium. The computer storage medium stores a computer program, and when the computer program is executed by a processor, the method according to the first aspect and the optional implementations of the first aspect is implemented.

According to an eighth aspect, this application provides a computer storage medium. The computer storage medium stores a computer program, and when the computer program is executed by a processor, the method according to the second aspect and the optional implementations of the second aspect is implemented.

According to a ninth aspect, this application provides a bandwidth configuration method for a cloud service. The method includes: providing a receiving template, where the template includes at least two IP addresses bound to a shared bandwidth package, a size of the shared bandwidth package, at least one IP address bound to each sub-bandwidth package, and a size of each sub-bandwidth package; and configuring the shared bandwidth package and the at least one sub-bandwidth package based on the receiving template.

The receiving template is provided, so that a tenant can configure a sub-bandwidth package based on a requirement of the tenant, to perform rate limiting on different types of packet traffic. In this way, traffic of a public cloud device can be managed more finely and flexibly based on the requirement of the tenant.

Optionally, the receiving template further includes a peak rate of the sub-bandwidth package, an assurance rate of the sub-bandwidth package, and priority information of the sub-bandwidth package.

According to a tenth aspect, this application provides a bandwidth configuration apparatus for a cloud service. The apparatus includes: a receiving template providing module, configured to provide a receiving template, where the template includes at least two IP addresses bound to a shared bandwidth package, a size of the shared bandwidth package, at least one IP address bound to each sub-bandwidth package, and a size of each sub-bandwidth package; and a bandwidth package configuration module, configured to configure the shared bandwidth package and the at least one sub-bandwidth package based on the receiving template. Optionally, the receiving template further includes a peak rate of the sub-bandwidth package, an assurance rate of the sub-bandwidth package, and priority information of the sub-bandwidth package.

The receiving template is provided, so that a tenant can configure a sub-bandwidth package based on a requirement of the tenant, to perform rate limiting on different types of packet traffic. In this way, traffic of a public cloud device can be managed more finely and flexibly based on the requirement of the tenant.

BRIEF DESCRIPTION OF DRAWINGS

To describe technical solutions in embodiments of this application or in the background clearer, the following briefly describes the accompanying drawings for describing the embodiments of this application or the background.

DESCRIPTION OF EMBODIMENTS

Figure 1:
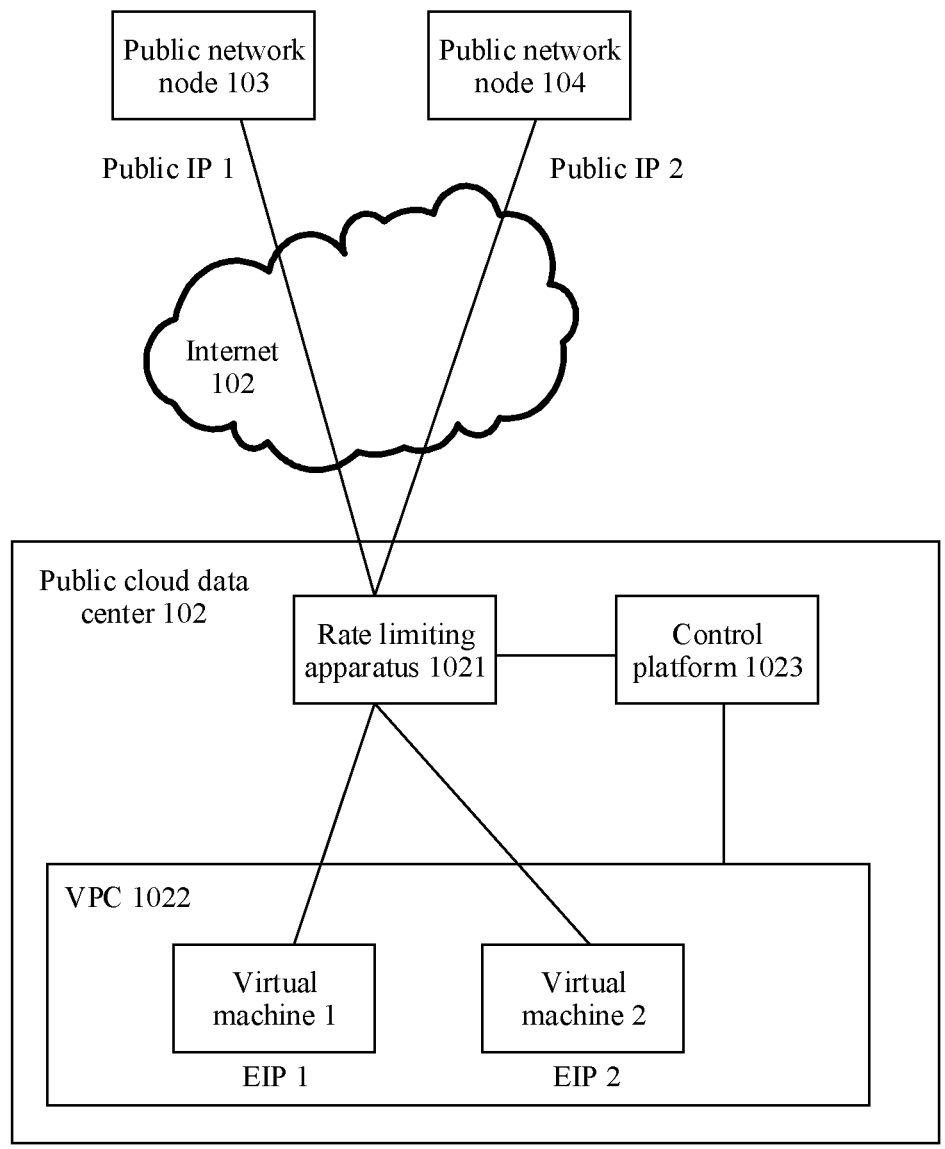
FIG. 1 is a diagram of a rate limiting system according to an embodiment.

First, terms used in the embodiments of the present application are described.

Public cloud: Computing, network, and storage devices are disposed in a public cloud data center, and a tenant obtains a right to use the public cloud devices by paying fees. Bandwidth package: To meet a bandwidth requirement for service interworking, a tenant needs to purchase the bandwidth package. Due to control of a bandwidth policy of the bandwidth package, traffic exceeding the bandwidth package is discarded. For example, an EIP bandwidth package is required for a public cloud to access the internet, and a cloud backbone bandwidth package is required for cross-region communication.

Region: A public cloud service provider deploys public cloud data centers in different geographical regions. Public cloud devices in the public cloud data centers in the different regions need to communicate with each other through a remote connection gateway.

Sub-bandwidth package: A shared bandwidth package may include a plurality of sub-bandwidth packages. Traffic bandwidth of the sub-bandwidth package is controlled by a bandwidth policy of the sub-bandwidth package.

EIP: a public IP address provided by a cloud service provider. After being bound to the EIP, a public cloud device may access a device on the internet and be accessed by the device on the internet. For example, the public cloud device is an elastic cloud server (ECS), a network address translation gateway (NATGW), an elastic load balancer (ELB), or a bare metal server. The ECS may be implemented by using a virtual machine or a container.

Traffic: a transmission rate of a packet. A type of traffic refers to a packet having a predetermined feature. A traffic type of the packet may be determined by identifying the feature of the packet. For example, the predetermined feature is a source IP address, a destination IP address, a source port number, a destination port number, or a protocol type of the packet.

Traffic classification: Traffic is classified into a plurality of priorities or service types based on packet features, such as a source IP address, a destination IP address, a source port number, a destination port number, and a protocol type.

Traffic Rate Limiting:

When data is transmitted on a network, to prevent network congestion, outgoing traffic of the network needs to be limited, so that the traffic can be sent out at a relatively even rate. A quantity of packets sent to the network can be controlled, and a burst packet is allowed to be sent. Similarly, traffic entering the network may be limited in a similar way.

Token Bucket Algorithm:

The token bucket algorithm is used to limit a traffic rate, and is a most commonly used algorithm in traffic shaping and rate limiting. Typically, the token bucket algorithm is used to control a quantity of packets sent to a network and allow burst packet transmission.

A token bucket with a fixed size can continuously generate tokens at a constant rate. If the tokens are not consumed or a consumption rate is lower than a generation rate, the tokens are continuously increased until the bucket is full. A token generated subsequently overflows from the bucket. Finally, a maximum quantity of tokens that can be stored in the bucket never exceeds a bucket size. A packet transmitted to the token bucket consumes an equal quantity of tokens based on a size of the packet. Packets of different sizes consume different quantity of tokens.

The token bucket is a control mechanism that indicates, based on whether there is a token in the token bucket, when traffic can be sent. Each token in the token bucket represents a byte. If there is a token in the token bucket, and the size of the packet is less than or equal to a quantity of tokens in the token bucket, the packet is allowed to be sent. If the size of the packet is greater than the quantity of tokens in the token bucket, the packet is not allowed to be sent.

A basic process of the token bucket algorithm is as follows:

If an average sending rate configured by a user is r, one token is added to the bucket every 1/r second.

It is assumed that the bucket can store a maximum of b tokens. If the token bucket is full when a token arrives, the token is discarded.

When a data packet of n bytes arrives, n tokens are deleted from the token bucket, and the data packet is sent to the network.

If there are less than n tokens in the token bucket, the tokens are not deleted, and it is considered that the data packet is beyond a traffic limit.

The algorithm allows a burst of a maximum of b bytes, but it can be learned from a long-term running result that a data packet rate is limited to a constant r. Data packets beyond the traffic limit may be processed in different manners:

The data packets may be discarded;

the data packets may be placed in a queue so that the data packets can be transmitted when enough tokens are accumulated in the token bucket; or the data packets may continue to be sent but need to be marked with a special flag, and when the network is overloaded, these packets with the special flag are discarded.

Committed information rate (CIR): indicates a rate at which tokens are put into a CBS bucket, namely, an average rate at which the C bucket allows transmission or forwarding of a packet.

Committed burst size (CBS): indicates a capacity of a CBS bucket, namely, committed burst traffic that can pass through the CBS bucket instantaneously.

Peak information rate (PIR): indicates a rate at which tokens are put into a PBS bucket, namely, a peak rate at which the P bucket allows transmission or forwarding of a packet. A value of the PIR needs to be greater than that of the CIR.

Peak burst size (PBS): indicates a capacity of a PBS bucket, namely, peak burst traffic that can pass through the P bucket instantaneously.

In the embodiments herein, the CIR is used as an assurance rate (also referred to as minimum bandwidth) of a sub-bandwidth package or a shared bandwidth package, the CBS is used as an assurance size of the sub-bandwidth package or the shared bandwidth package, the PIR is used as a peak rate (also referred to as maximum bandwidth) of the sub-bandwidth package, and the PBS is used as a peak size of the sub-bandwidth package.

In an embodiment, a bandwidth package on a cloud is usually executed by using a bandwidth policy of the shared bandwidth package.

For mutual-access packet traffic between a public cloud and the internet, an EIP bandwidth package needs to be purchased, including exclusive bandwidth and shared bandwidth. Corresponding bandwidth policies are configured on a border router of the public cloud.

For the exclusive bandwidth of the EIP, the border router identifies an exclusive bandwidth package to which the EIP belongs, obtains the corresponding bandwidth policy, and executes bandwidth control of the corresponding bandwidth. Traffic that exceeds the exclusive bandwidth is discarded.

For shared bandwidth of a plurality of EIPs, the plurality of EIPs may belong to one shared bandwidth package. The border router also identifies the shared bandwidth package to which the EIPs belong, to obtain bandwidth information, and then completes rate limiting of the bandwidth.

The foregoing bandwidth package rate limiting solution meets a basic rate limiting requirement, and a same bandwidth policy is executed for all traffic in the bandwidth package, but traffic in the bandwidth is not distinguished. However, in an actual situation, traffic contention occurs in the bandwidth package. A type of service packet preempts a large amount of bandwidth in the bandwidth package. Consequently, another service may fail to obtain enough bandwidth, and therefore the service is affected.

The shared bandwidth package of the EIPs is used as an example. For example, an EIP may occupy a large amount of bandwidth of the shared bandwidth package at a moment. Consequently, another EIP of the shared bandwidth package fails to obtain valid bandwidth, and therefore a service of the another EIP is affected.

Based on this, in the embodiments herein, for a problem that according to the bandwidth package rate limiting policy in the foregoing solution, bandwidth traffic cannot be distinguished and identified, and different service packets contend for bandwidth with each other, an embodiment provides a bandwidth management method for a cloud service, including the following steps:

configuring a shared bandwidth package for a tenant of the cloud service, where the shared bandwidth package is bound to at least two IP addresses, and the tenant accesses the internet by using the at least two IP addresses;

configuring at least one sub-bandwidth package, where each sub-bandwidth package is bound to at least one IP address; and performing rate limiting management on packet traffic from the at least two IP addresses based on the at least one sub-bandwidth package and the shared bandwidth package.

The following technical problems can be resolved:

The shared bandwidth package is divided into a plurality of sub-bandwidth packages. On a premise that a bandwidth policy of the shared bandwidth package is met, different bandwidth policies may be independently set for different sub-bandwidth packages. For example, maximum bandwidth and minimum bandwidth of the sub-bandwidth package may be set. In this way, other service traffic is prevented from being affected.

The shared bandwidth package is divided into sub-bandwidth packages based on traffic. On a premise that each service traffic can contend for bandwidth in the total shared bandwidth package, a rate limiting policy of the sub-bandwidth package may be separately set, so that not only a bandwidth requirement of the total shared bandwidth package can be met, but also a bandwidth requirement of the sub-bandwidth package can be ensured.

Further, an embodiment provides a bandwidth configuration method for the cloud service, including the following steps:

providing a shared bandwidth package configuration interface, where the shared bandwidth package configuration interface includes a first input box and a second input box, the first input box requires a tenant of the cloud service to enter at least two IP addresses bound to the shared bandwidth package, and the second input box requires the tenant to enter a size of the shared bandwidth package;

providing a sub-bandwidth package configuration interface, where the sub-bandwidth package configuration interface includes at least one sub-bandwidth package configuration bar, each sub-bandwidth package configuration bar includes a third input box and a fourth input box, the third input box requires the tenant to enter at least one IP address bound to a current sub-bandwidth package, and the fourth input box requires the tenant to enter a size of the current sub-bandwidth package; and receiving configuration information entered by the tenant, and configuring the shared bandwidth package and at least one sub-bandwidth package based on the configuration information.

The configuration interface is provided, so that the tenant can configure a sub-bandwidth package based on a requirement of the tenant, to perform rate limiting on different types of packet traffic. In this way, traffic of a public cloud device can be managed more finely and flexibly based on the requirement of the tenant.

Implementations of the bandwidth management method and the bandwidth configuration method are described in the following.

It should be noted that, in the embodiments herein, traffic rate limiting may be separately performed in an uplink direction and a downlink direction of service packet traffic. For ease of description, in the embodiments herein, an uplink service packet is used as an example for description. FIG. 1 is a diagram of a rate limiting system according to an embodiment. As shown in FIG. 1, the system includes public network nodes 103 and 104 and a public cloud data center 102. The public cloud data center 102 includes a rate limiting apparatus 1021 and a control platform 1023. The rate limiting apparatus 1021 accesses the internet 102, and establishes a network connection to each of the public network nodes 103 and 104. The rate limiting apparatus 1021 is further connected to the control platform 1023. A virtual machine 1 and a virtual machine 2 are disposed on a virtual private cloud (VPC) 1022. The rate limiting apparatus 1021 is separately connected to the virtual machine 1 and the virtual machine 2.

The public network nodes 103 and 104 are sites that have public IP addresses. The public network node 103 is provided with a public IP 1, and the public network node is provided with a public IP 2. The virtual machine 1 is bound to an EIP 1, and the virtual machine 2 is bound to an EIP 2.

It is assumed that the virtual machine 1 needs to access the public network node 103. In this case, the virtual machine 1 constructs a packet by using the EIP 1 as a source IP address and the public IP 1 of the public network node 103 as a destination IP address, and sends the packet to the internet 102 through the rate limiting apparatus 1021. Then, the packet is sent to the public network node 103 through a routing device (not shown in the figure) of the internet 102.

Similarly, it is assumed that the virtual machine 2 needs to access the public network node 104. In this case, the virtual machine 2 constructs a packet by using the EIP 2 as a source IP address and the public IP 2 of the public network node 104 as a destination IP address, and sends the packet to the internet 102 through the rate limiting apparatus 1021. Then, the packet is sent to the public network node 104 through the routing device (not shown in the figure) of the internet 102.

Therefore, both service packet traffic from the virtual machine 1 to the public network node 103 and service packet traffic from the virtual machine 2 to the public network node 104 pass through the rate limiting apparatus 1021. The rate limiting apparatus 1021 performs traffic classification on the received packet traffic based on the source IP addresses of the service packets, to obtain the service packet traffic from the virtual machine 1 to the public network node 103 and the service packet traffic from the virtual machine 2 to the public network node 104, and then separately places, in different receiving queues, the packets corresponding to the foregoing two types of traffic (this process is described in detail in the following).

In this embodiment, the rate limiting apparatus 1021 may be a border router of the public cloud data center 102, or a sub-module disposed in the border router. The border router may be a hardware network device, a physical server cluster, a virtual machine, or a virtual network function (VNF) module.

The control platform 1023 provides a configuration interface on the internet 102 for access by a client (not shown in the figure, for example, a personal electronic device such as a terminal, a personal computer, or a tablet computer that is connected to the internet 102) that is connected to the internet 102. A user may purchase and configure the VPC 1022 on the control platform 1023 by operating the client, set the virtual machine 1 and the virtual machine 2 on the VPC 1022, purchase the EIP 1 and the EIP 2 on the control platform 1023, and bind the EIP 1 to the virtual machine 1 and the EIP 2 to the virtual machine 2.

Because the virtual machine 1 and the virtual machine 2 need to access the internet 102, communication between a public cloud device and a device on the internet is involved herein. The user needs to further operate the client to purchase and configure, on the control platform 1023, a shared bandwidth package applicable to the EIP 1 and the EIP 2. The shared bandwidth package is used to perform rate limiting on packet traffic that uses the EIP 1 as a source IP address and packet traffic that uses the EIP 2 as a source IP address. In addition, a rate limiting policy is set. The control platform 1023 sends the rate limiting policy to the rate limiting apparatus 1021. The rate limiting apparatus 1021 performs rate limiting on the packet traffic sent by the virtual machine 1 to the public network node 103 and the packet traffic sent by the virtual machine 2 to the public network node 104.

Figure 2:
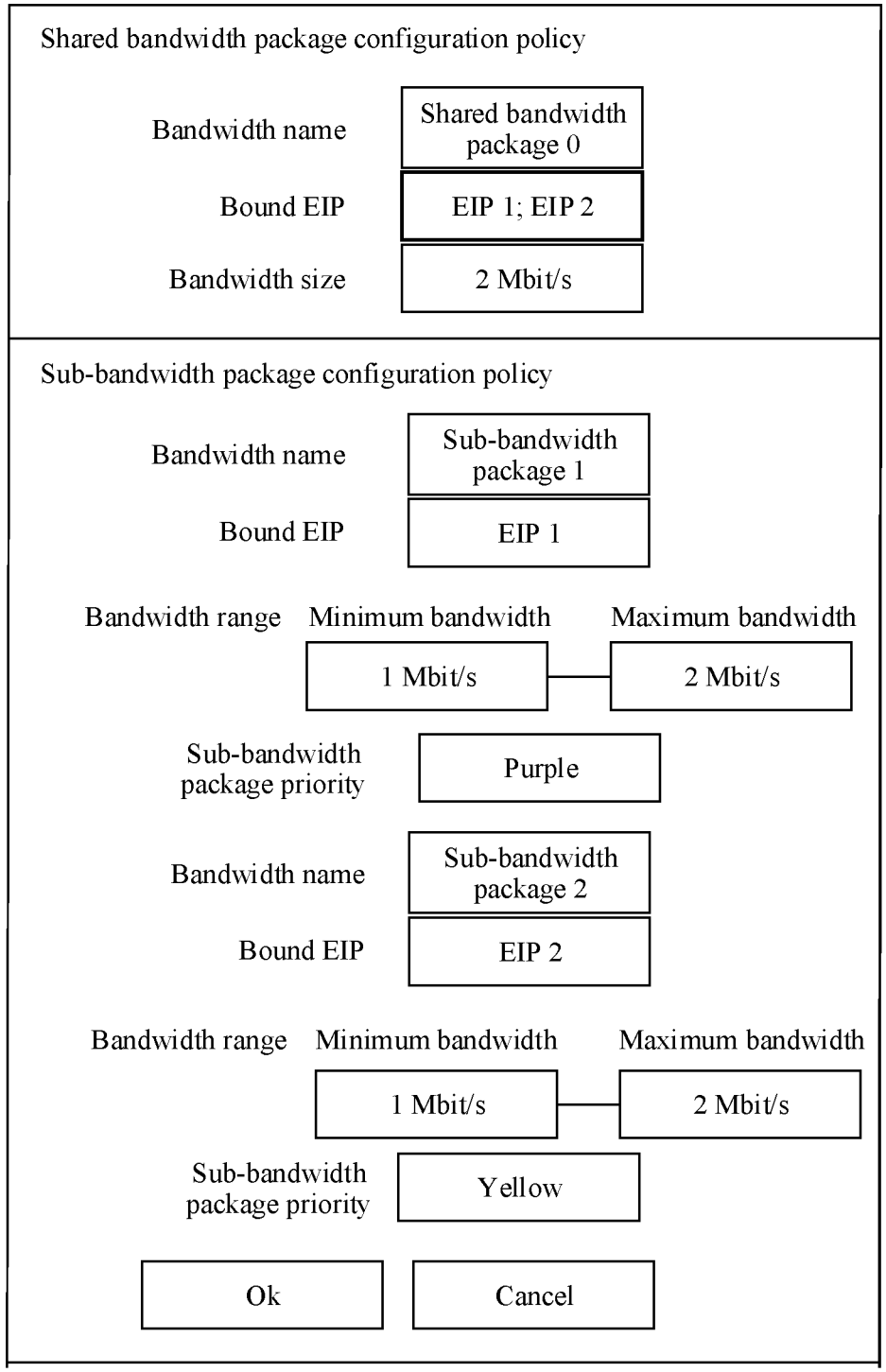
FIG. 2 is a diagram of a shared bandwidth package configuration interface of a control platform according to an embodiment.

FIG. 2 is a diagram of a shared bandwidth package configuration interface of a control platform according to an embodiment. As shown in FIG. 2, the shared bandwidth package configuration interface is used by a user to enter a bandwidth package configuration policy. The bandwidth package configuration policy includes a shared bandwidth package configuration policy and a sub-bandwidth package configuration policy.

The user may set a shared bandwidth package in the following manner:
name of the shared bandwidth package: shared bandwidth package 0;
EIPs bound to the shared bandwidth package: an EIP 1 and an EIP 2; and
bandwidth of the shared bandwidth package: 2 Mbit/s.

A sub-bandwidth package may be set in the following manner:

A sub-bandwidth package 1 is created in the shared bandwidth package 0:
name of the sub-bandwidth package: shared bandwidth package 1;
EIP bound to the sub-bandwidth package 1: the EIP 1;
a bandwidth range of the sub-bandwidth package 1 is: minimum bandwidth: 1 Mbit/s; and maximum bandwidth: 2 Mbit/s; and
priority of the sub-bandwidth package 1: purple.

A sub-bandwidth package 2 is created in the shared bandwidth package 0:
name of the sub-bandwidth package: shared bandwidth package 2;
EIP bound to the sub-bandwidth package 2: the EIP 2;
a bandwidth range of the sub-bandwidth package 2 is: minimum bandwidth: 1 Mbit/s; and maximum bandwidth: 2 Mbit/s; and
priority of the sub-bandwidth package 2: yellow.

In another embodiment, a quantity of sub-bandwidth packages is not limited to the "two" shown in this embodiment, and may be any positive integer.

In addition, a priority may be set for each sub-bandwidth package. A yellow priority is a default priority. When no priority is configured, the priority of the sub-bandwidth package is set to yellow by default. A purple priority is higher than the yellow priority. Therefore, in a rate limiting apparatus 1021, when packet traffic of the EIP 1 and packet traffic of the EIP 2 contend for the bandwidth of the shared bandwidth package, the packet traffic of the EIP 1 preferentially passes through.

Further, in this embodiment, for ease of description, the bandwidth ranges of the sub-bandwidth package 1 and the sub-bandwidth package 2 are both set to 1 Mbit/s to 2 Mbit/s. However, in another embodiment, the bandwidth ranges of the sub-bandwidth package 1 and the sub-bandwidth package 2 may alternatively be set to be different, provided that the following rules are complied with:

1. A shared bandwidth package may be divided into sub-bandwidth packages based on traffic. Service packet traffic of an EIP can be added to one sub-bandwidth package. On a premise that a bandwidth policy of the total shared bandwidth package is met, different bandwidth policies may be independently set for different sub-bandwidth packages.

2. The sub-bandwidth package may be configured with maximum bandwidth and minimum bandwidth.

3. The minimum bandwidth of the sub-bandwidth package is an assurance rate, and the maximum bandwidth is a peak rate.

4. A sum of minimum bandwidth of all the sub-bandwidth packages cannot exceed bandwidth of the shared bandwidth package.

5. A sum of maximum bandwidth of all the sub-bandwidth packages can exceed the bandwidth of the shared bandwidth package. Each sub-bandwidth package may contend for remaining bandwidth of the total shared package when bandwidth of the sub-bandwidth package is guaranteed.

6. The sub-bandwidth package may be configured with a contention priority. The sub-bandwidth package configured with the contention priority may preempt the bandwidth of the total bandwidth package when bandwidth of the sub-bandwidth package is guaranteed.

Figure 3:
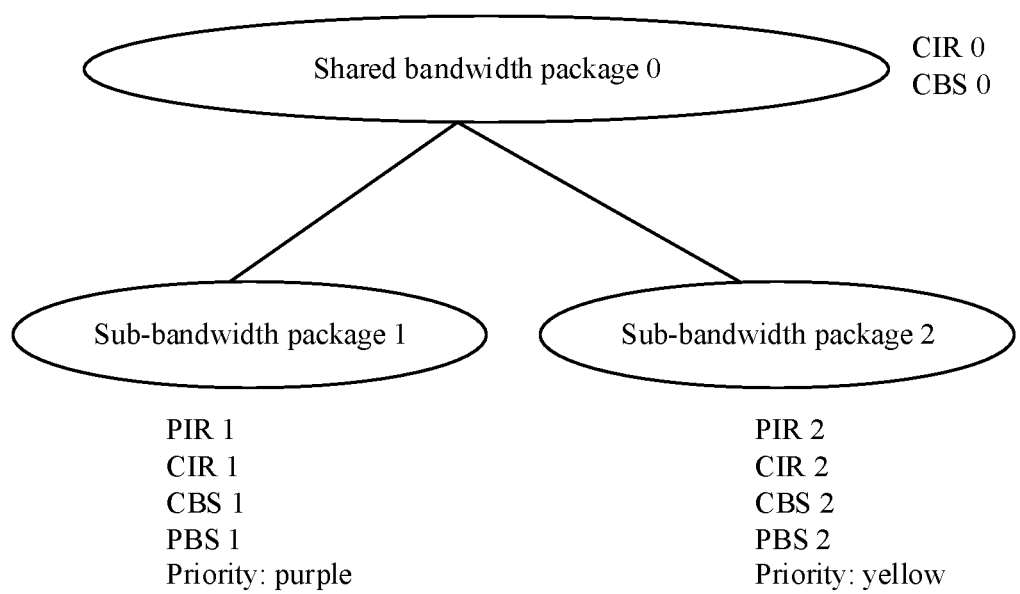
FIG. 3 is a diagram of a bandwidth package topology according to an embodiment.

FIG. 3 is a diagram of a bandwidth package topology according to an embodiment. The topology is generated based on the configuration in FIG. 2, and shows a relationship between the shared bandwidth package 0, the sub-bandwidth package 1, and the sub-bandwidth package 2.

As shown in FIG. 3, a CIR 0 and a committed burst size 0 are set for the shared bandwidth package 0. The CIR 0 is the bandwidth size of the shared bandwidth package 0 and is 2 Mbit/s, and the CBS 0 is a capacity of a token bucket of the shared bandwidth package 0.

A CIR 1, a CBS 1, a PIR 1, and a PBS 1 are set for the sub-bandwidth package 1. The CIR 1 is the minimum bandwidth (an assurance rate) of the sub-bandwidth package 1 and is 1 Mbit/s, the PIR 1 is the maximum bandwidth (a peak rate) of the sub-bandwidth package 1 and is 2 Mbit/s, the CBS 1 is a capacity of a CBS token bucket of the sub-bandwidth package 1, and the PBS 1 is a capacity of a PBS of the sub-bandwidth package 1.

A CIR 2, a CBS 2, a PIR 2, and a PBS 2 are set for the sub-bandwidth package 2. The CIR 2 is the minimum bandwidth (an assurance rate) of the sub-bandwidth package 2 and is 1 Mbit/s, the PIR 2 is the maximum bandwidth (a peak rate) of the sub-bandwidth package 2 and is 2 Mbit/s, the CBS 2 is a capacity of a CBS token bucket of the sub-bandwidth package 2, and the PBS 2 is a capacity of a PBS token bucket of the sub-bandwidth package 2.

For the sub-bandwidth package 1 and the sub-bandwidth package 2, the CBS is determined based on the CIR. The CBS may be determined by using an empirical value formula. For example, the empirical value formula is:

$$CBS = CIR * 16000/8$$

The CBS $0 = 2*16000/8 = 4000$.
Therefore:
In the sub-bandwidth package 1, the CIR $1 = 1$ Mbit/s, so that the CBS $1 = 1*16000/8 = 2000$.

The PBS is determined based on the PIR. The PBS may be determined by using an empirical value formula. For example, the empirical value formula is:

$$PBS = PIR \times 12000/8$$

The PBS $1 = 2*12000/8 = 3000$.
In the sub-bandwidth package 2, the CIR $2 = 1$ Mbit/s, the CBS $2 = 1*16000/8 = 2000$.
T PBS $2 = 2*12000/8 = 3000$.

The CBS 0 of the shared bandwidth package is set to a sum of the CBS 1, the CBS 2, and a constant C. For example:

The CBS 0 = the CBS 1 + the CBS 2 + C.
C is an empirical value, for example, 1000.
In this case, the CBS 0 = the CBS 1 + the CBS $2 + C = 2000 + 2000 + 1000 = 5000$.

In addition, the priority of the sub-bandwidth package 1 is purple, and the priority of the sub-bandwidth package 2 is yellow, where the purple priority is higher than the yellow priority. It should be noted that, in the embodiments herein, priorities further involved are green and red, and the priorities are ranked as follows:

green>purple>yellow>red.

The rate limiting apparatus 1021 uses the priorities to label packets, and correspondingly processes packets with different priority labels based on different priorities. Details are described below.

Further, meanings of parameters such as the PBS, the PIR, the CIR, and the CBS that are related to the shared bandwidth package and the sub-bandwidth package are also described in detail in the following.

Figure 4:
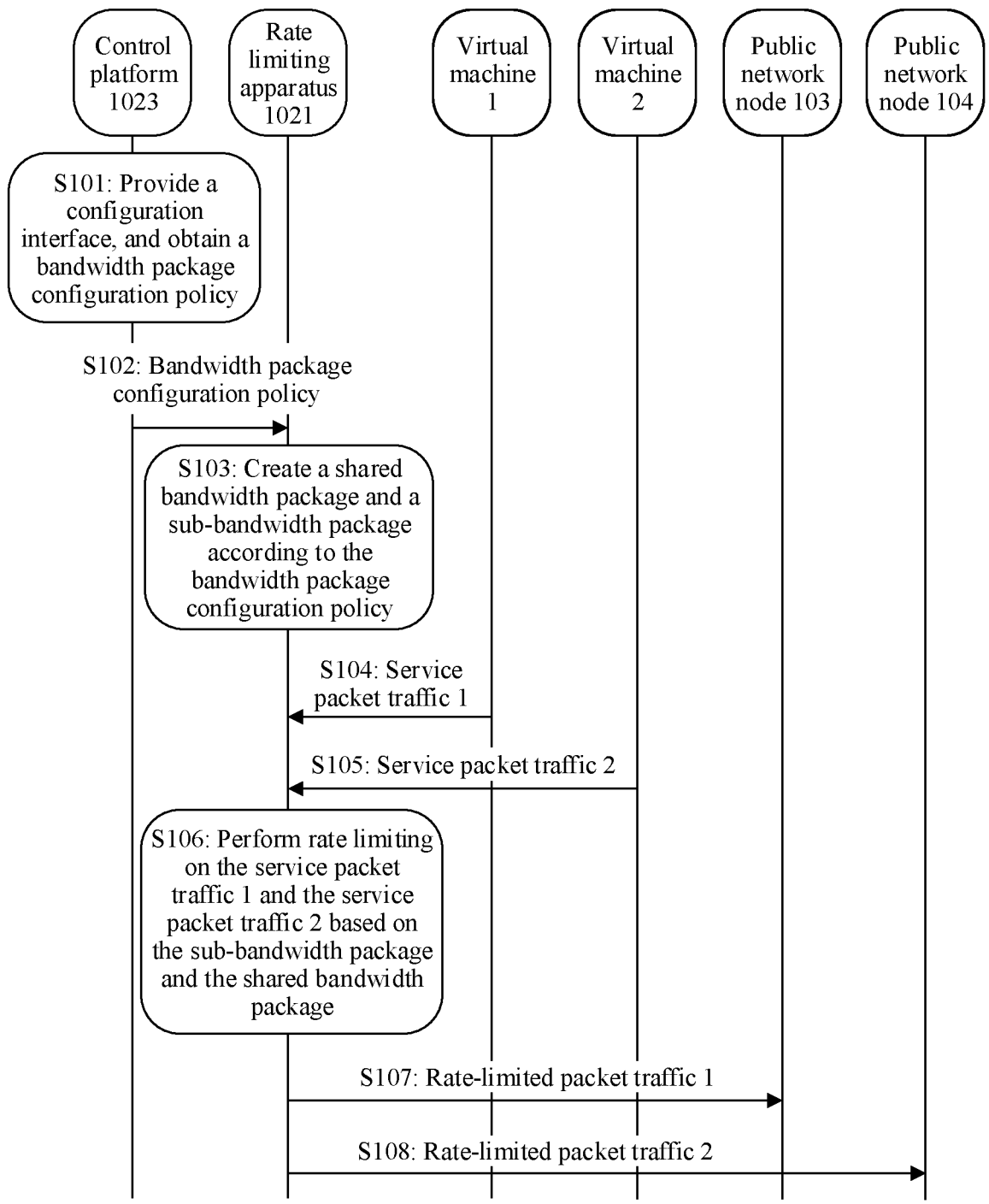
FIG. 4 is a data interaction diagram of a rate limiting method according to an embodiment.

FIG. 4 is a data interaction diagram of a rate limiting method according to an embodiment. As shown in FIG. 4, the rate limiting method includes the following steps.

Step S101: A control platform 1023 provides a configuration interface, and obtains a bandwidth package configuration policy.

The configuration interface is shown in FIG. 2. The bandwidth package configuration policy includes a shared bandwidth package configuration policy and a sub-bandwidth package configuration policy. The bandwidth package configuration policy is configuration information entered by a tenant.

The configuration interface includes a shared bandwidth package configuration interface and a sub-bandwidth package configuration interface. The shared bandwidth package configuration interface includes a first input box and a second input box. The first input box requires a tenant of a cloud service to enter at least two IP addresses bound to a shared bandwidth package, and the second input box requires the tenant to enter a size of the shared bandwidth package.

The sub-bandwidth package configuration interface includes at least one sub-bandwidth package configuration bar. Each sub-bandwidth package configuration bar includes a third input box and a fourth input box. The third input box requires the tenant to enter at least one IP address bound to a current sub-bandwidth package, and the fourth input box requires the tenant to enter a size of the current sub-bandwidth package.

The configuration information entered by the tenant is received from the shared bandwidth package configuration interface and the sub-bandwidth package configuration interface, and is used as the bandwidth package configuration policy. The shared bandwidth package and at least one sub-bandwidth package are configured based on the configuration information.

The tenant can enter the configuration information through filling in or selecting.

Further, the fourth input box is used to receive a peak rate that is of the current sub-bandwidth package and that is configured by the tenant.

The fourth input box is further used to receive an assurance rate that is of the current sub-bandwidth package and that is configured by the tenant.

Each sub-bandwidth package configuration bar further includes a fifth input box. The fifth input box is used to require the tenant to configure priority information of each sub-bandwidth package. The priority information of each sub-bandwidth package is used to indicate a contention priority, in the shared bandwidth package, of a packet corresponding to the IP address bound to the current sub-bandwidth package.

Optionally, in this step, the configuration information may alternatively be obtained by providing a receiving template. The receiving template is, for example, a template downloaded by the tenant from the control platform in advance. The tenant may fill the configuration information in the receiving template and send the receiving template to the control platform. Step S102: The control platform 1023 sends the bandwidth package configuration policy to a rate limiting apparatus 1021.

Step S103: The rate limiting apparatus 1021 creates a shared bandwidth package 0 and sub-bandwidth packages 1 and 2 according to the bandwidth package configuration policy.

A process of obtaining a CBS based on a CIR and obtaining a PBS based on a PIR may be executed by the rate limiting apparatus 1021.

It should be noted that the rate limiting apparatus 1021 may notify the control platform 1023 that the shared bandwidth package 0 and the sub-bandwidth packages 1 and 2 are successfully created and configured, and the control platform 1023 records the shared bandwidth package 0 and the sub-bandwidth packages 1 and 2. In this way, a process of configuring the shared bandwidth package and the at least one sub-bandwidth package based on the configuration information is implemented.

In this step, the shared bandwidth package is configured for the tenant of the cloud service, and the at least two IP addresses share the shared bandwidth package. In addition, the at least one sub-bandwidth package is configured, and each sub-bandwidth package is bound to the at least one IP address. Through the foregoing configuration, the rate limiting apparatus 1021 may perform rate limiting management on packet traffic based on the at least one sub-bandwidth package and the shared bandwidth package.

The at least two IP addresses are configured by the tenant.

Step S104: Service packet traffic 1 sent by a virtual machine 1 to a public network node 103 arrives at the rate limiting apparatus 1021.

In this step, the virtual machine 1 may set the rate limiting apparatus 1021 as a default gateway. Packet traffic sent to the internet needs to first arrive at the default gateway and is sent to the internet through the default gateway.

Step S105: Service packet traffic 2 sent by a virtual machine 2 to a public network node 104 arrives at the rate limiting apparatus 1021.

In this step, the virtual machine 2 may set the rate limiting apparatus 1021 as a default gateway. Packet traffic sent to the internet needs to first arrive at the default gateway and is sent to the internet through the default gateway.

Step S106: The rate limiting apparatus 1021 performs rate limiting on the service packet traffic 1 and the service packet traffic 2 based on the sub-bandwidth packages 1 and 2 and the shared bandwidth package 0.

Step S107: The rate limiting apparatus 1021 sends the rate-limited service packet traffic 1 to the public network node 103.

Step S108: The rate limiting apparatus 1021 sends the rate-limited service packet traffic 2 to the public network node 104.

Figure 5:
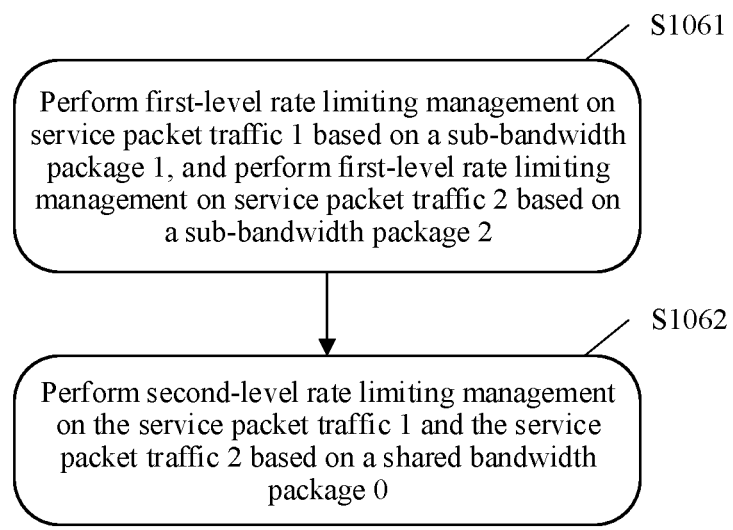
FIG. 5 is a flowchart of a rate limiting method according to an embodiment.

FIG. 5 is a flowchart of a rate limiting method according to an embodiment. As shown in FIG. 5, step S106 includes the following sub-steps.

Step S1061: The rate limiting apparatus 1021 performs first-level rate limiting management on the service packet traffic 1 based on the sub-bandwidth package 1, and performs first-level rate limiting management on the service packet traffic 2 based on the sub-bandwidth package 2.

In this step, based on a peak parameter of a first sub-bandwidth package, the rate limiting apparatus 1021 discards a first packet and allows a second packet to pass through. A size of the first packet is greater than a first threshold, and a size of the second packet is less than or equal to the first threshold. The first threshold is determined based on a peak parameter of the first sub-bandwidth package.

The peak parameter includes a peak rate and a peak size. The first threshold is a quantity of tokens, in a first token bucket, that is determined based on a first peak rate and a first peak size.

Further, the rate limiting apparatus 1021 adds a priority label to the second packet based on the size of the second packet. When the size of the second packet is less than or equal to a second threshold, a highest priority label is added to the second packet. When the size of the second packet is greater than the second threshold, a second highest priority label is added to the second packet. The second threshold is determined based on an assurance parameter of the first sub-bandwidth package.

Each sub-bandwidth package further includes an assurance parameter. The assurance parameter is an assurance rate and an assurance size, and the second threshold is a quantity of tokens, in a second token bucket, that is determined based on the assurance rate and the assurance size.

Step S1062: The rate limiting apparatus 1021 performs second-level rate limiting management on the service packet traffic 1 and the service packet traffic 2 based on the shared bandwidth package 0.

The shared bandwidth package includes a first waterline and a second waterline. A quantity of tokens corresponding to the first waterline is greater than a quantity of tokens corresponding to the second waterline.

The second-level rate limiting management includes:

performing rate limiting management based on a priority label of a packet, where a packet having the highest priority label obtains a token within a range of the first waterline, and a packet having the second highest priority label obtains a token within a range of the second waterline.

Optionally, each sub-bandwidth package further includes priority information. The priority information of each sub-bandwidth package is used to indicate a contention priority, in the shared bandwidth package, of a packet corresponding to the IP address bound to the current sub-bandwidth package.

The shared bandwidth package includes at least three waterlines. A first waterline corresponds to a largest quantity of tokens, and a third waterline corresponds to a smallest quantity of tokens.

The second-level rate limiting management includes:

performing rate limiting management based on a priority label of a packet, where a packet having the highest priority label obtains a token within a range of the first waterline, a packet having the second highest priority label and a high contention priority obtains a token within a range of the second waterline, and a packet having the second highest priority label and a low contention priority obtains a token within a range of the third waterline.

Figure 6A:
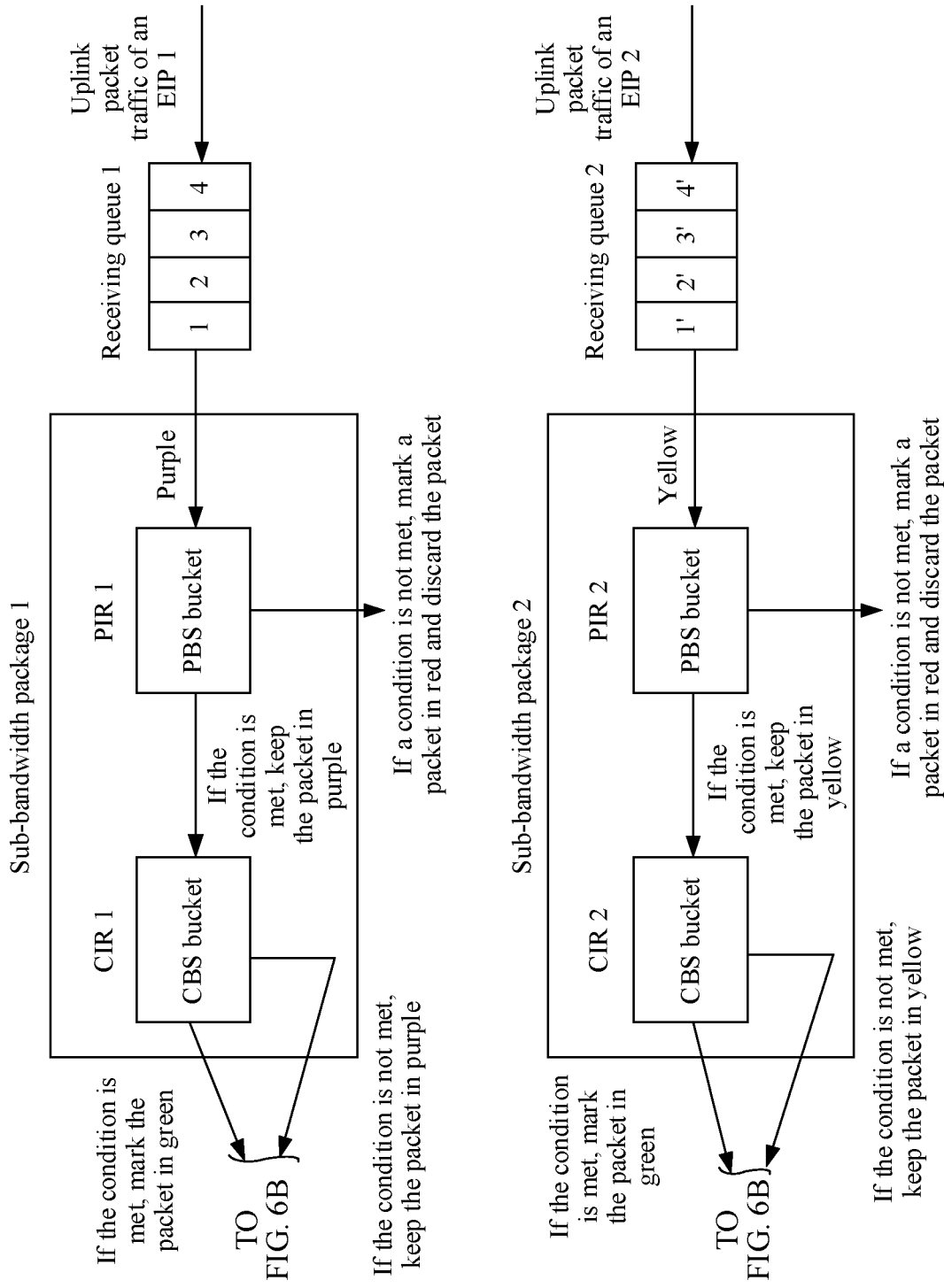
FIG. 6A and FIG. 6B are a diagram of a packet processing process of a rate limiting method according to an embodiment.
Figure 6B:
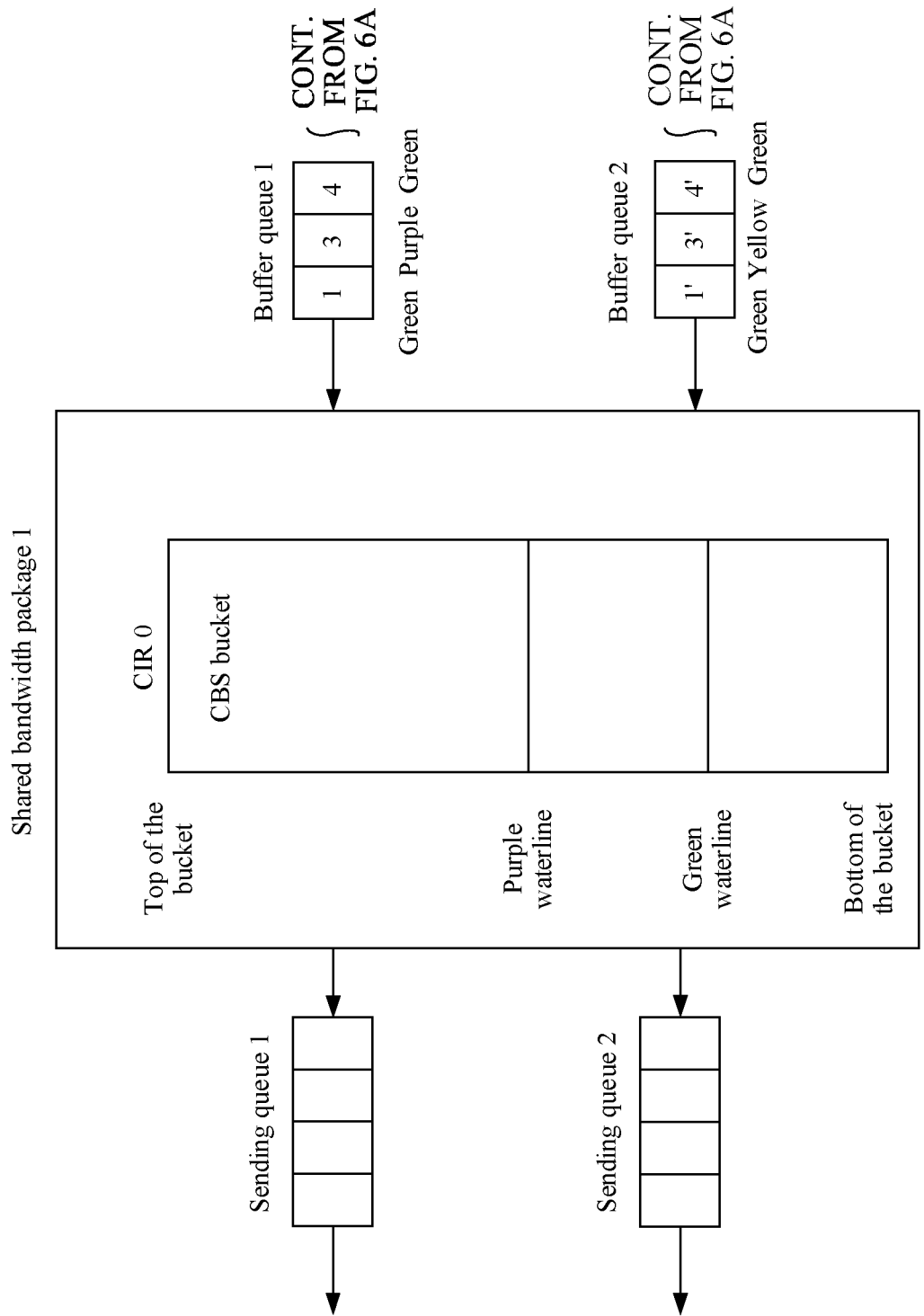

For clearer description, refer to FIG. 6A and FIG. 6B. FIG. 6A and FIG. 6B are a diagram of a packet processing process of a rate limiting method according to an embodiment. As shown in FIG. 6A and FIG. 6B, receiving queues 1 and 2, intermediate queues 1 and 2, and sending queues 1 and 2 are disposed in the rate limiting apparatus 1021. The foregoing queues may be implemented by using storage space in a memory of the rate limiting apparatus 1021, and the queues are first in first out queues.

In the rate limiting apparatus 1021, the receiving queue 1, the intermediate queue 1, and the sending queue 1 serve the service packet traffic 1, and the receiving queue 2, the intermediate queue 2, and the sending queue 2 serve the service packet traffic 2.

The rate limiting apparatus 1021 identifies a source IP address of a received packet, and sends the packet to the receiving queue 1 when the source IP address of the packet is an EIP 1, or sends the packet to the receiving queue 2 when the source IP address of the packet is an EIP 2.

In another embodiment, the rate limiting apparatus 1021 may alternatively identify a destination IP address of the received packet. This is not limited in the embodiments herein.

Each location in the receiving queue represents a packet received per unit time. For example, for the receiving queue 1, a packet 1 is received between 0 ms and 1 ms, a packet 2 is received between 1 ms and 2 ms, a packet 3 is received between 2 ms and 3 ms, no packet is received between 3 ms and 4 ms, and a packet 4 is received between 4 ms and 5 ms. For the receiving queue 2, a packet 1' is received between 0 ms and 1 ms, a packet 2' is received between 1 ms and 2 ms, a packet 3' is received between 2 ms and 3 ms, no packet is received between 3 ms and 4 ms, and a packet 4' is received between 4 ms and 5 ms.

Therefore, between 0 ms and 1 ms, the rate limiting apparatus 1021 receives the packet 1 and the packet 1'; between 1 ms and 2 ms, the rate limiting apparatus 1021 receives the packet 2 and the packet 2'; between 2 ms and 3 ms, the rate limiting apparatus 1021 receives the packet 3 and the packet 3; between 3 ms and 4 ms, the rate limiting apparatus 1021 does not receive a packet; and between 4 ms and 5 ms, the rate limiting apparatus 1021 receives the packet 4 and the packet 4'.

In this case, between 0 ms and 1 ms, the packet 1 and the packet 1' are concurrent. The rate limiting apparatus 1021 performs rate limiting on the packet 1 based on the sub-bandwidth package 1, and performs rate limiting on the packet 2 based on the sub-bandwidth package 2. This prevents the packet 1 and the packet 1' from directly contending for bandwidth CIR 0 in the shared bandwidth package 0. Similar processing is also performed on concurrent packets between 1 ms and 2 ms, between 2 ms and 3 ms, and between 4 ms and 5 ms.

In this embodiment, it is assumed that a packet length of the packet 1 is 1500 bytes, a packet length of the packet 2 is 1800 bytes, a packet length of the packet 3 is 1000 bytes, and a packet length of the packet 4 is 900 bytes. In addition, for ease of description, a packet length of the packet 1' is assumed to be the same as that of the packet 1, a packet length of the packet 2' is assumed to be the same as that of the packet 2, a packet length of the packet 3' is assumed to be the same as that of the packet 3, and a packet length of the packet 4' is assumed to be the same as that of the packet 4. In addition, it is assumed that a CBS 1, a CBS 2, a CBS 0, a PBS 1, and a PBS 2 are all fully loaded with tokens at the 0 ms moment.

In this embodiment, the rate limiting apparatus 1021 sends the packet 1 to the PBS 1. When the packet 1 does not meet a condition specified by a PIR 1 and the PBS 1, the packet 1 is marked in red and discarded. When the packet 1 meets the condition specified by the PIR 1 and the PBS 1, the packet 1 is marked in purple (namely, a priority of the sub-bandwidth package 1) and sent to a CBS token bucket of the sub-bandwidth package 1. When the packet 1 does not meet a condition specified by the CBS 1 and a CIR 1, a priority color of the packet 1 remains purple, and the packet 1 is sent to the intermediate queue 1. When the packet 1 meets the condition specified by the CBS 1 and the CIR 1, the packet 1 is marked in purple and sent to the intermediate queue 1.

Figure 7:
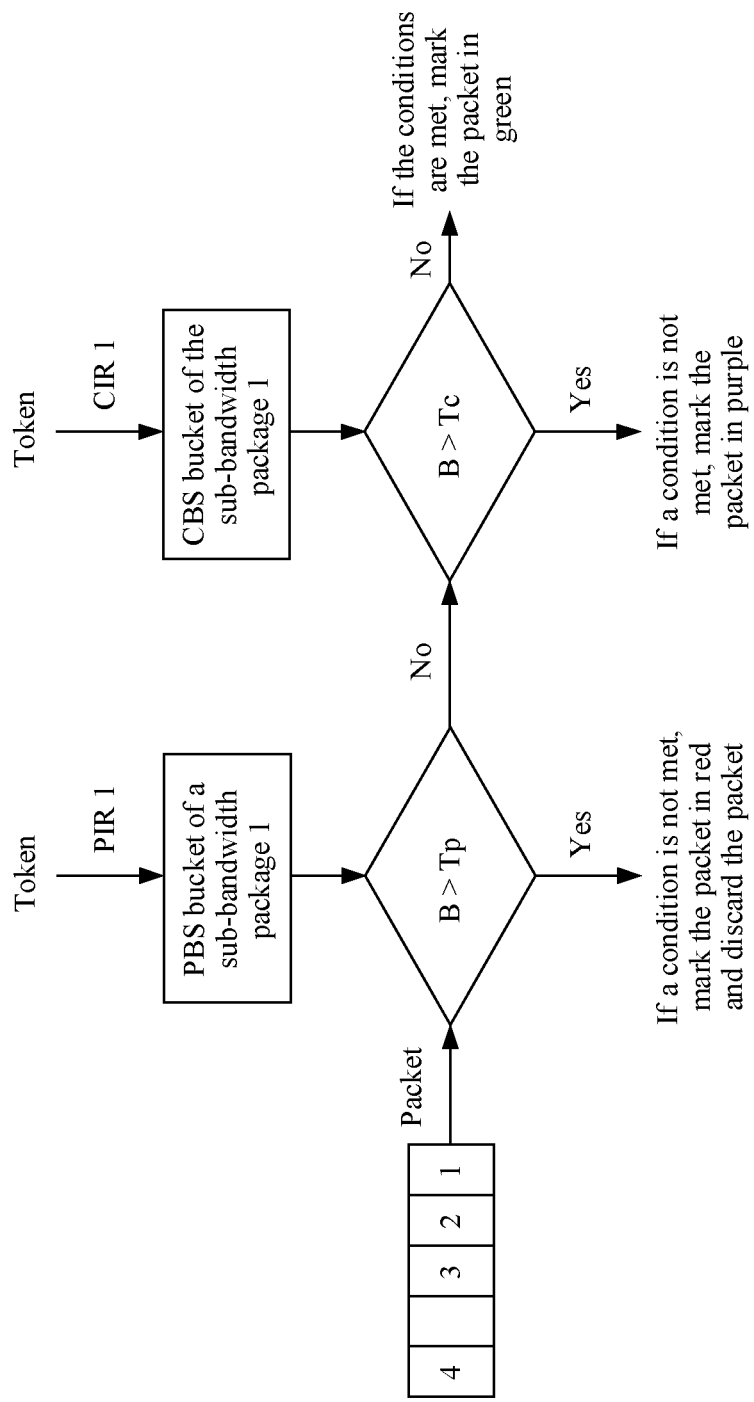
FIG. 7 is a schematic logic diagram of rate limiting of a sub-bandwidth package 1 according to an embodiment.

For ease of description, refer to FIG. 7. FIG. 7 is a diagram of rate limiting logic of the sub-bandwidth package 1 according to an embodiment. A dual-rate dual-bucket algorithm is used for the sub-bandwidth package 1, as shown in FIG. 7.

Four parameters of the sub-bandwidth package 1:

1. PIR 1:
a peak information rate, representing a rate at which the rate limiting apparatus 1021 puts tokens into a PBS bucket of the sub-bandwidth package 1;

2. CIR 1:
a committed information rate, representing a rate at which the rate limiting apparatus 1021 puts tokens into the CBS bucket of the sub-bandwidth package 1;

3. PBS 1:
a peak burst size, representing a capacity of the PBS bucket of the sub-bandwidth package 1, namely, peak burst traffic that can pass through the PBS bucket of the sub-bandwidth package 1 instantaneously.

4. CBS 1:
a committed burst size, representing a capacity of the CBS bucket of the sub-bandwidth package 1, namely, committed burst traffic that can pass through the CBS bucket of the sub-bandwidth package 1 instantaneously.

The rate limiting apparatus 1021 puts the tokens into the PBS bucket of the sub-bandwidth package 1 at a rate specified by the PIR 1, and puts the tokens into the CBS bucket of the sub-bandwidth package 1 at a rate specified by the CIR 1:

When Tp<the PBS 1, a quantity of tokens in the PBS bucket of the sub-bandwidth package 1 increases; and when Tp≥the PBS 1, the quantity of tokens in the PBS bucket of the sub-bandwidth package 1 does not increase.

When Tc<the CBS 1, a quantity of tokens in the CBS bucket of the sub-bandwidth package 1 increases; otherwise, the quantity of tokens in the CBS bucket of the sub-bandwidth package 1 does not increase.

For an arriving packet, B is used to represent a size of the packet, Tp represents the quantity of tokens in the PBS bucket of the sub-bandwidth package 1, and Tc represents the quantity of tokens in the CBS bucket of the sub-bandwidth package 1:

If Tp<B, the packet is marked in red.

If Tc<B≤Tp, the packet is marked in purple, which is the priority of the sub-bandwidth package 1, and Tp decreases by B.

If B≤Tc, the packet is marked in green, and both Tp and Tc decrease by B.

Similarly, four parameters of the sub-bandwidth package 2:

1. PIR 2:
representing a rate at which the rate limiting apparatus 1021 puts tokens into a PBS bucket of the sub-bandwidth package 2;

2. CIR 2:
representing a rate at which the rate limiting apparatus 1021 puts tokens into a CBS bucket of the sub-bandwidth package 2;

3. PBS 2:
representing a capacity of the PBS bucket of the sub-bandwidth package 2, namely, peak burst traffic that can pass through the PBS bucket of the sub-bandwidth package 2 instantaneously.

4. CBS 2:
representing a capacity of the CBS bucket of the sub-bandwidth package 2, namely, committed burst traffic that can pass through the CBS bucket of the sub-bandwidth package 2 instantaneously.

The rate limiting apparatus 1021 puts the tokens into the PBS bucket of the sub-bandwidth package 2 at the PIR 2 rate, and puts the tokens into the CBS bucket of the sub-bandwidth package 2 at the CIR 2 rate:

When Tp<the PBS 2, a quantity of tokens in the PBS bucket of the sub-bandwidth package 2 increases; otherwise, the quantity of tokens in the PBS bucket of the sub-bandwidth package 2 does not increase.

When Tc<the CBS 2, a quantity of tokens in the CBS bucket of the sub-bandwidth package 2 increases; otherwise, the quantity of tokens in the CBS bucket of the sub-bandwidth package 2 does not increase.

For an arriving packet, B is used to represent a size of the packet, Tp represents the quantity of tokens in the PBS bucket of the sub-bandwidth package 2, and Tc represents the quantity of tokens in the CBS bucket of the sub-bandwidth package 2:

If Tp<B, the packet is marked in red.

If Tc<B≤Tp, the packet is marked in yellow, which is a priority of the sub-bandwidth package 2, and Tp decreases by B.

If B≤Tc, the packet is marked in green, and both Tp and Tc decrease by B.

For different processing periods, corresponding traffic-based rate limiting is performed as follows:

First, in a processing period of 0 ms to 1 ms:

For the packet 1, a size of the packet 1 is 1500 bytes. In other words, B=1500 bytes. In an initial state, the quantity Tp of tokens in the PBS bucket of the sub-bandwidth package 1 is 3000. Therefore, the condition specified by the PBS 1 and the PIR 1 is met: B≤Tp. The rate limiting apparatus 1021 marks the packet 1 with a purple mark, and sends the packet 1 to the CBS bucket of the sub-bandwidth package 1. The quantity Tc of tokens in the CBS bucket of the sub-bandwidth package 1 is 2000. Therefore, the condition specified by the CBS 1 and the CIR 1 is met: B≤Tc. The rate limiting apparatus 1021 marks the packet 1 with a green mark, and sends the packet 1 to the intermediate queue 1.

In this case, a quantity of remaining tokens in the PBS bucket of the sub-bandwidth package 1 is 3000−1500=1500, and a quantity of remaining tokens in the CBS bucket of the sub-bandwidth package 1 is 2000−1500=500.

Figure 8:
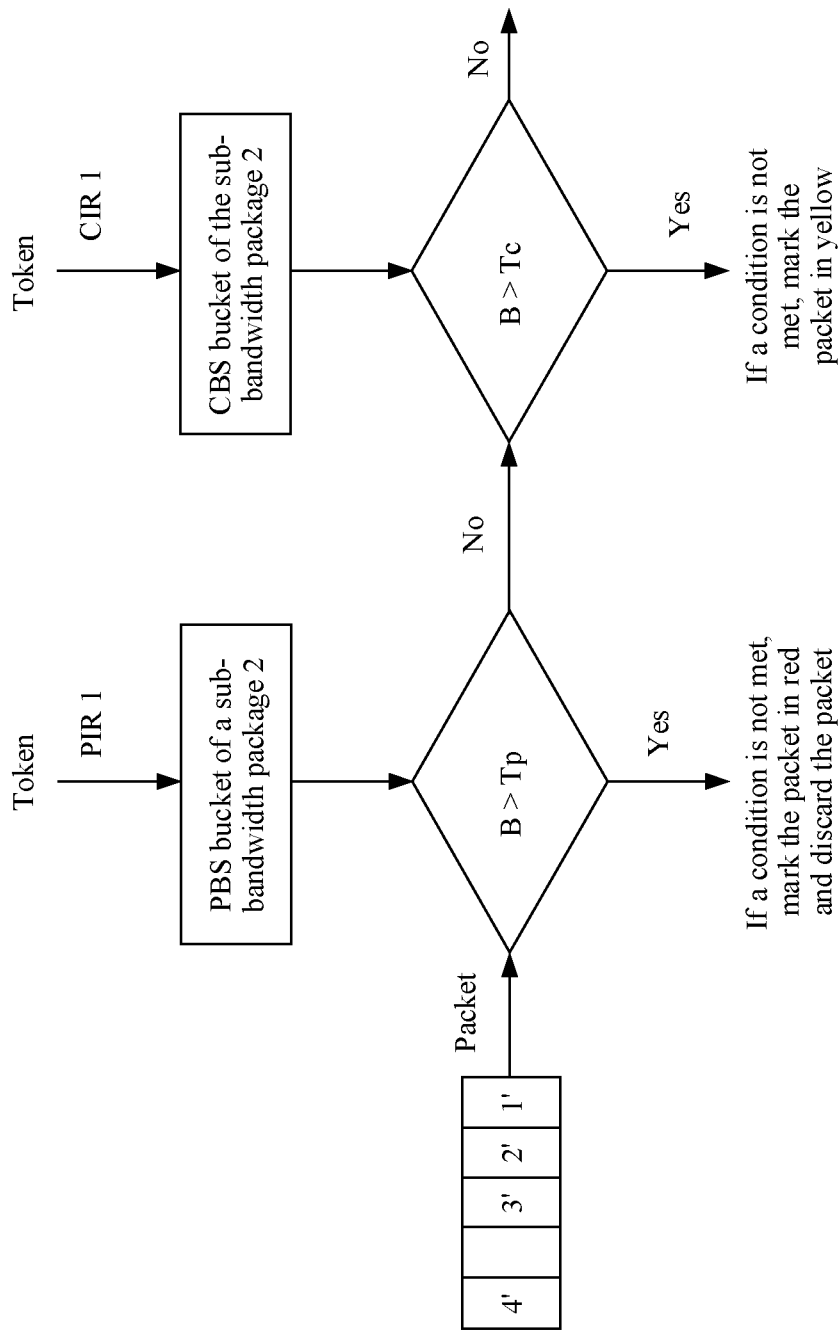
FIG. 8 is a logic diagram of rate limiting of a sub-bandwidth package 2 according to an embodiment.

Similarly, refer to FIG. 8. FIG. 8 is a diagram of rate limiting logic of the sub-bandwidth package 2 according to an embodiment. The rate limiting apparatus 1021 sends the packet 1' to the PBS bucket of the sub-bandwidth package 2. When the packet 1' does not meet a condition specified by the PIR 2 and the PBS 2, the packet 1' is marked in red and discarded. When the packet 1' meets the condition specified by the PIR 2 and the PBS 2, the packet 1' is marked in yellow (namely, the priority of the sub-bandwidth package 2) and sent to the CBS bucket of the sub-bandwidth package 2. When the packet 1' does not meet a condition specified by the CBS 2 and the CIR 2, a priority color of the packet 1' remains purple, and the packet 1' is sent to the intermediate queue 1. When the packet 1' meets the condition specified by the CBS 2 and the CIR 2, the packet 1' is marked in purple and sent to the intermediate queue 1.

In the sub-bandwidth package 2, a size of the packet 1' is 1500 bytes, that is, B=1500 bytes, and in an initial state, the quantity Tp of tokens in the PBS bucket of the sub-bandwidth package 2 is 3000. Therefore, the condition specified by the PBS 2 and the PIR 2 is met: B≤Tp. The rate limiting apparatus 1021 marks the packet 1' with a purple mark, and sends the packet 1 to the CBS bucket of the sub-bandwidth package 2. The quantity Tc of tokens in the CBS bucket of the sub-bandwidth package 2 is 2000. Therefore, the condition specified by the CBS 2 and the CIR 2 is met: B≤Tc. The rate limiting apparatus 1021 marks the packet 1 with a green mark, and sends the packet 1 to the intermediate queue 2.

In this case, a quantity of remaining tokens in the PBS bucket of the sub-bandwidth package 2 is updated to 3000−1500=1500, and a quantity of remaining tokens in the CBS bucket of the sub-bandwidth package 2 is updated to 2000−1500=500.

In a processing period of 1 ms to 2 ms:

For the packet 2, a size of the packet 2 is 1800 bytes. In other words, B=1800 bytes. After 1 ms, a quantity of newly added tokens in the PBS bucket of the sub-bandwidth package 1 is the PIR $1*1$ ms=$2*10^6$ bit/s×$1\times10^{-3}$s÷8=250 bytes, so that the quantity Tp of tokens in the PBS bucket of the sub-bandwidth package 1 is 1500+250=1750 bytes. The packet 2 does not meet the condition specified by the PBS 1 and the PIR 1: B≤Tp. Therefore, the rate limiting apparatus 1021 marks the packet 2 with a red mark, discards the packet 2, and does not send the packet 2 to the CBS bucket of the sub-bandwidth package 1. In this case, a quantity of newly added tokens in the CBS bucket of the sub-bandwidth package 1 is the CIR $1*1$ ms=$1*10^6$ bit/s×$1\times10^{-3}$s÷8=125 bytes, so that the quantity Tc of tokens in the CBS bucket of the sub-bandwidth package 1 is 500+125=625 bytes. In this case, the quantity of remaining tokens in the PBS bucket of the sub-bandwidth package 1 is 1750, and the quantity of remaining tokens in the CBS bucket of the sub-bandwidth package 1 is 625.

For the packet 2', a size of the packet 2' is 1800 bytes. In other words, B=1800 bytes. After 1 ms, a quantity of newly added tokens in the PBS bucket of the sub-bandwidth package 2 is the PIR $2*1$ ms=$2*10^6$ bit/s×$1\times10^{-3}$s÷8=250 bytes, so that the quantity Tp of tokens in the PBS bucket of the sub-bandwidth package 2 is 1500+250=1750 bytes. The packet 2' does not meet the condition specified by the PBS 2 and the PIR 2: B≤Tp. Therefore, the rate limiting apparatus 1021 marks the packet 2' with a red mark, discards the packet 2, and does not send the packet 2 to the CBS bucket of the sub-bandwidth package 2. In this case, a quantity of newly added tokens in the CBS bucket of the sub-bandwidth package 2 is the CIR $2*1$ ms=$1*10^6$ bit/s×$1\times10^{-3}$s÷8=125 bytes, so that the quantity Tc of tokens in the CBS bucket of the sub-bandwidth package 2 is 500+125=625 bytes.

In this case, the quantity of remaining tokens in the PBS bucket of the sub-bandwidth package 2 is 1750, and the quantity of remaining tokens in the CBS bucket of the sub-bandwidth package 2 is 625.

In a processing period of 2 ms to 3 ms:

For the packet 3, a size of the packet 3 is 1000 bytes. In other words, B=1000 bytes. After 1 ms, the quantity of newly added tokens in the PBS bucket of the sub-bandwidth package 1 is the PIR $1*1$ ms=$2*10^6$ bit/s×$1\times10^{-3}$s÷8=250 bytes, so that the quantity Tp of tokens in the PBS bucket of the sub-bandwidth package 1 is 1750+250=2000 bytes. The packet 3 meets the condition specified by the PBS 1 and the PIR 1: B≤Tp. Therefore, the rate limiting apparatus 1021 marks the packet 3 with the purple mark of the sub-bandwidth package 1, and sends the packet 3 to the CBS bucket of the sub-bandwidth package 1. In this case, the quantity Tc of newly added tokens in the CBS bucket of the sub-bandwidth package 1 is the CIR $1*1$ ms=$1*10^6$ bit/s×$1\times10^{-3}$s÷8=125 bytes, so that the quantity Tc of tokens in the CBS bucket of the sub-bandwidth package 1 is 625+125=750 bytes. The packet 3 does not meet the condition specified by the CBS 1 and the CIR 1: B≤Tc. Therefore, the packet 3 is marked in purple and sent to the intermediate queue 1.

In this case, the quantity of remaining tokens in the PBS bucket of the sub-bandwidth package 1 is 2000−1000=1000, and the quantity of remaining tokens in the CBS bucket of the sub-bandwidth package 1 is 750.

For the packet 3', a size of the packet 3' is 1000 bytes. In other words, B=1000 bytes. After 1 ms, the quantity of newly added tokens in the PBS bucket of the sub-bandwidth package 2 is the PIR $2*1$ ms=$2*10^6$ bit/s×$1\times10^{-3}$s÷8=250 bytes, so that the quantity Tp of tokens in the PBS bucket of the sub-bandwidth package 1 is 1750+250=2000 bytes. The packet 3' meets the condition specified by the PBS 2 and the PIR 2: B≤Tp. Therefore, the rate limiting apparatus 1021 marks the packet 3' with a yellow mark of the sub-bandwidth package 2, and sends the packet 3' to the CBS bucket of the sub-bandwidth package 2. In this case, the quantity of newly added tokens in the CBS bucket of the sub-bandwidth package 2 is the CIR 2$*1$ ms=$1*10^6$ bit/s$\times 1\times 10^{-3}$s$\div 8$=125 bytes, so that the quantity Tc of tokens in the CBS bucket of the sub-bandwidth package 2 is 625+125=750 bytes. The packet 3' does not meet the condition specified by the CBS 2 and the CIR 2: B≤Tc. Therefore, the packet 3' is marked in purple and sent to the intermediate queue 2.

In this case, the quantity of remaining tokens in the PBS bucket of the sub-bandwidth package 2 is 2000−1000=1000, and the quantity of remaining tokens in the CBS bucket of the sub-bandwidth package 2 is 750.

In a processing period of 3 ms to 4 ms:

Because neither the service packet traffic 1 nor the service packet traffic 2 has a packet in the processing period, rate limiting processing is not required, and corresponding locations in the intermediate queues 1 and 1' are empty.

In a processing period of 4 ms to 5 ms:

For the packet 4, a size of the packet 4 is 900 bytes. In other words, B=900 bytes. After 2 ms, the quantity of newly added tokens in the PBS bucket of the sub-bandwidth package 1 is the PIR 1$\times 2$ ms=$2*10^6$ bit/s$\times 2\times 10^{-3}$s$\div 8$=500 bytes, so that the quantity Tp of tokens in the PBS bucket of the sub-bandwidth package 1 is 1000+500=1500 bytes. The packet 4 meets the condition specified by the PBS 1 and the PIR 1: B≤Tp. Therefore, the rate limiting apparatus 1021 marks the packet 4 with the purple mark of the sub-bandwidth package 1, and sends the packet 4 to the CBS bucket of the sub-bandwidth package 1. In this case, the quantity of newly added tokens in the CBS bucket of the sub-bandwidth package 1 is the CIR 1$*2$ ms=$1*10^6$ bit/s$\times 2\times 10^{-3}$s$\div 8$=250 bytes, so that the quantity Tc of tokens in the CBS bucket of the sub-bandwidth package 1 is 750+250=1000 bytes. The packet 4 meets the condition specified by the CBS 1 and the CIR 1: B≤Tc. Therefore, the packet 4 is marked with the green mark and sent to the intermediate queue 1.

In this case, the quantity of remaining tokens in the PBS bucket of the sub-bandwidth package 1 is 1500−900=600, and the quantity of remaining tokens in the CBS bucket of the sub-bandwidth package 1 is 1000−900=100.

For the packet 4', a size of the packet 4' is 900 bytes. In other words, B=900 bytes. After 2 ms, the quantity of newly added tokens in the PBS bucket of the sub-bandwidth package 2 is the PIR2$*2$ ms=$2*10^6$ bit/s$\times 2\times 10^{-3}$s$\div 8$=500 bytes, so that the quantity Tp of tokens in the PBS bucket of the sub-bandwidth package 2 is 1000+500=1500 bytes. The packet 4' meets the condition specified by the PBS 2 and the PIR 2: B≤Tp. Therefore, the rate limiting apparatus 1021 marks the packet 4' with the yellow mark of the sub-bandwidth package 2, and sends the packet 4' to the CBS bucket of the sub-bandwidth package 2. In this case, the quantity of newly added tokens in the CBS bucket of the sub-bandwidth package 1 is the CIR 1$*1$ ms=$1*10^6$ bit/s$\times 2\times 10^{-3}$s$\div 8$=250 bytes, so that the quantity Tc of tokens in the CBS bucket of the sub-bandwidth package 1 is 750+250=1000 bytes. The packet 4' meets the condition specified by the CBS 1 and the CIR 1: B≤Tc. Therefore, the packet 4' is marked with the green mark and sent to the intermediate queue 1.

In this case, the quantity of remaining tokens in the PBS bucket of the sub-bandwidth package 1 is 1500−900=600, and the quantity of remaining tokens in the CBS bucket of the sub-bandwidth package 1 is 1000−900=100.

For ease of description, refer to Table 1 and Table 2.

TABLE 1

| | | | | | Tokens in each bucket after tokens are added | | Remaining tokens in each bucket after packet processing | | |
|---|---|---|---|---|---|---|---|---|---|
| Sequence number of a packet | Moment (ms) | Packet length (bytes) | Interval from last token adding (ms) | Tokens added in this round | CBS bucket of the sub-bandwidth package 1 | PBS bucket of the sub-bandwidth package 1 | CBS bucket of the sub-bandwidth package 1 | PBS bucket of the sub-bandwidth package 1 | Packet marking result |
| | | | | CBS 1 / PBS 1 | 2000 | 3000 | 2000 | 3000 | |
| 1 | 0 | 1500 | 0 | 0 / 0 | 2000 | 3000 | 500 | 1500 | Green |
| 2 | 1 | 1800 | 1 | 125 / 250 | 625 | 1750 | 625 | 1750 | Red |
| 3 | 2 | 1000 | 1 | 125 / 250 | 750 | 2000 | 750 | 1000 | Purple |
| 4 | 4 | 900 | 2 | 250 / 500 | 1000 | 1500 | 100 | 600 | Green |

TABLE 2

| | | | | | Tokens in each bucket after tokens are added | | Remaining tokens in each bucket after packet processing | | |
|---|---|---|---|---|---|---|---|---|---|
| Sequence number of a packet | Moment (ms) | Packet length (bytes) | Interval from last token adding (ms) | Tokens added in this round | CBS bucket of the sub-bandwidth package 2 | PBS bucket of the sub-bandwidth package 2 | CBS bucket of the sub-bandwidth package 2 | PBS bucket of the sub-bandwidth package 2 | Packet marking result |
| | | | | CBS 1 / PBS 1 | 2000 | 3000 | 2000 | 3000 | |
| 1' | 0 | 1500 | 0 | 0 / 0 | 2000 | 3000 | 500 | 1500 | Green |
| 2' | 1 | 1800 | 1 | 125 / 250 | 625 | 1750 | 625 | 1750 | Red |
| 3' | 2 | 1000 | 1 | 125 / 250 | 750 | 2000 | 750 | 1000 | Purple |
| 4' | 4 | 900 | 2 | 250 / 500 | 1000 | 1500 | 100 | 600 | Green |

Table 1 shows a process of processing a packet of the service packet traffic 1 in the sub-bandwidth package 1, and Table 2 shows a process of processing the packet of the service packet traffic 1 in the sub-bandwidth package 2.

It can be learned from the foregoing description that, in a traffic-based rate limiting process, because a rate of the packet 2 is excessively high, the packet 2 is filtered out by the sub-bandwidth package 1 before the tokens in the CBS bucket of the sub-bandwidth package 1 are accumulated to a quantity of tokens corresponding to the packet length of the packet 2, that is, accumulated to 1800 or more. Because a rate of the packet 2' is excessively high, the packet 2' is filtered out by the sub-bandwidth package 2 before the tokens in the CBS bucket of the sub-bandwidth package 2 are accumulated to a quantity of tokens corresponding to the packet length of the packet 2', that is, accumulated to 1800 or more. Therefore, a user may set a packet rate limiting policy in the sub-bandwidth package, so that traffic-based rate limiting can be performed on different packet traffic.

Figure 9:
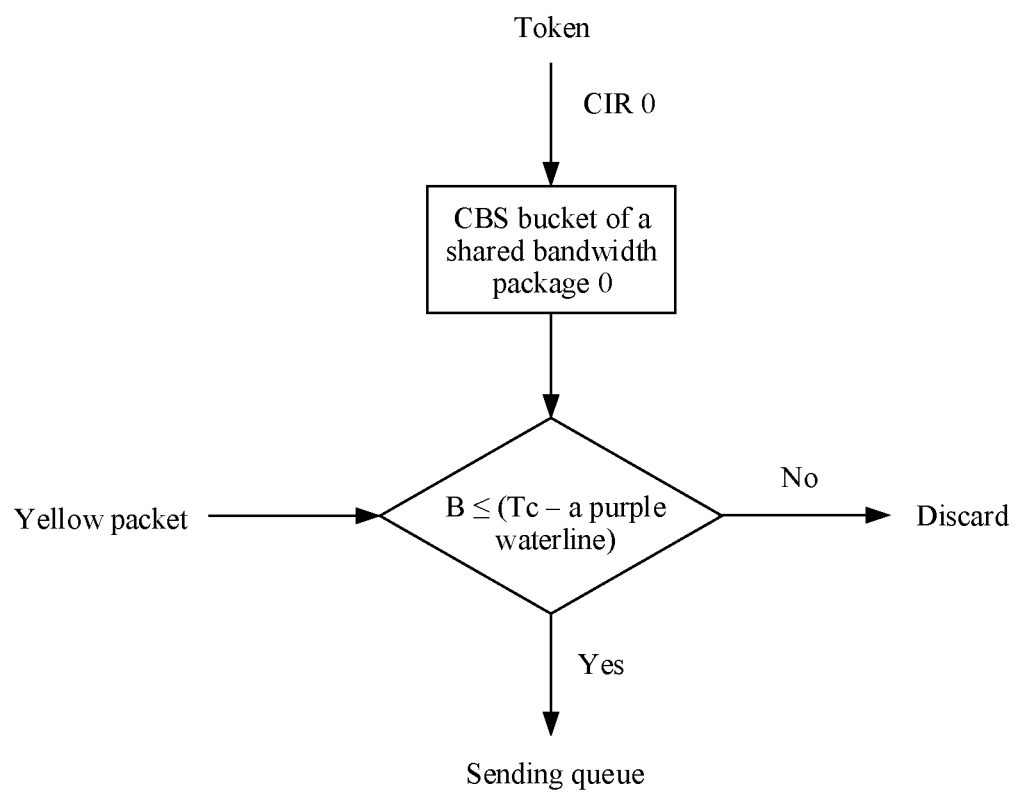
FIG. 9 is a logic diagram of rate limiting of a shared bandwidth package 0 on a yellow packet according to an embodiment.
Figure 10:
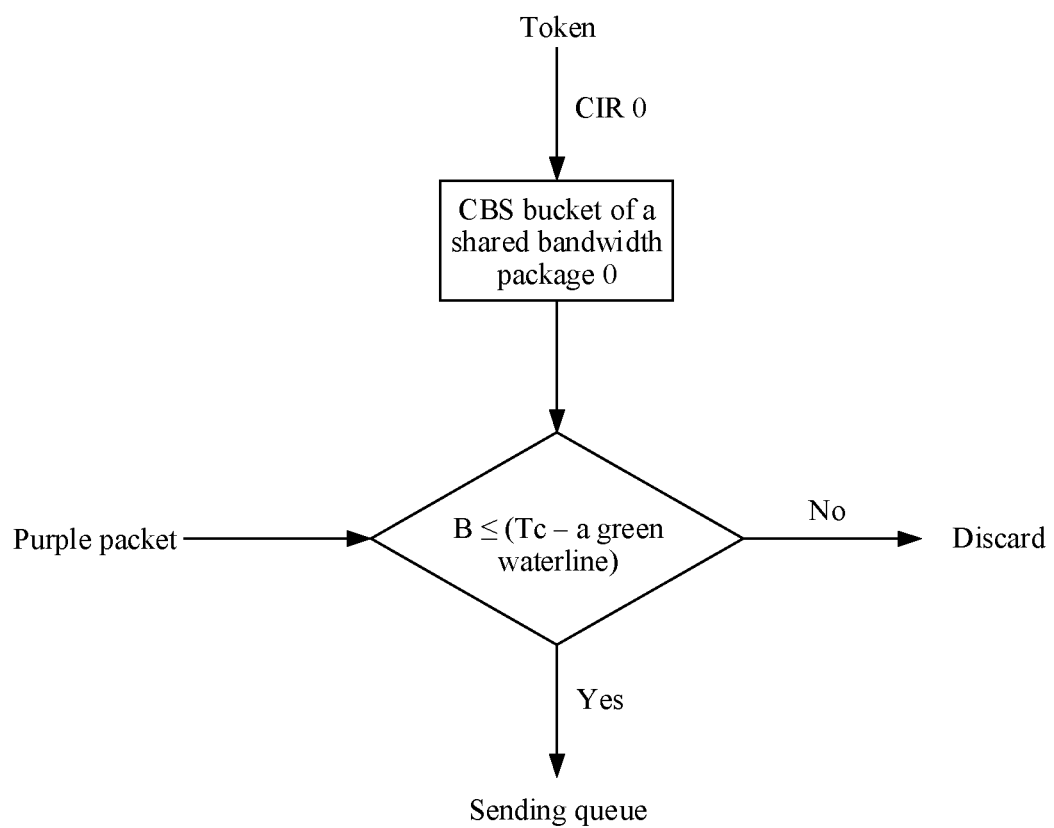
FIG. 10 is a logic diagram of rate limiting of a shared bandwidth package 0 on a purple packet according to an embodiment.
Figure 11:
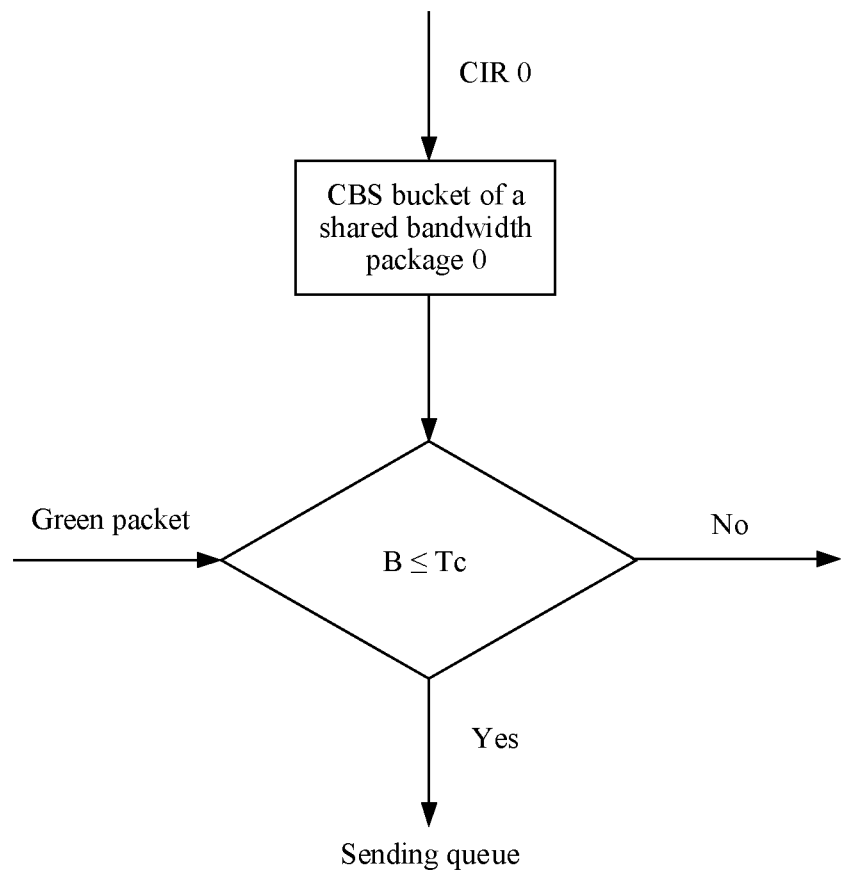
FIG. 11 is a logic diagram of rate limiting of a shared bandwidth package 0 on a green packet according to an embodiment.

In the following, still refer to FIG. 6A and FIG. 6B. Packets in the intermediate queue 1 and the intermediate queue 1' are sent by the rate limiting apparatus 1021 to the shared bandwidth package 0 for overall rate limiting. A token bucket algorithm of single rate single bucket+waterline is used for the shared bandwidth package 0. Refer to FIG. 9 to FIG. 11. FIG. 9 is a diagram of rate limiting logic of the shared bandwidth package 0 for a yellow packet according to an embodiment. FIG. 10 is a diagram of rate limiting logic of the shared bandwidth package 0 for a purple packet according to an embodiment. FIG. 11 is a diagram of rate limiting logic of the shared bandwidth package 0 for a green packet according to an embodiment.

Still refer to FIG. 6A and FIG. 6B, in this embodiment, a green waterline and a purple waterline are set in a CBS bucket of the shared bandwidth package 0. A value of the purple waterline is greater than a value of the green waterline, and the purple waterline and the green waterline may be set according to an empirical value. For example, the purple waterline=the CBS 0/2=5000/2=2500, and the green waterline=the CBS 0/10=5000/10=500.

A bucket depth of the CBS bucket of the shared bandwidth package 0 is 4000. When the packets in the intermediate queue 1 and the intermediate queue 1' need to contend for tokens in the CBS 0, in this embodiment, waterlines are set to allocate assurance tokens to packets having different priorities.

For the yellow packet, the yellow packet can use only a token above a purple waterline in the CBS bucket of the shared bandwidth package 0. For the purple packet, the purple packet can use only a token above a green waterline in the CBS bucket of the shared bandwidth package 0. For the green packet, the green packet can use all tokens in the CBS bucket of the shared bandwidth package 0.

In a single rate single bucket mode, the rate limiting apparatus 1021 puts tokens into the CBS bucket of the shared bandwidth package 0 at the CIR 0 rate.

If a total quantity (Tc) of available tokens in the CBS bucket of the shared bandwidth package 0 is less than the CBS 0 (namely, 4000), the quantity of tokens continues to increase.

If the CBS bucket of the shared bandwidth package 0 is full, the quantity of tokens stops increasing.

As shown in FIG. 9, for a yellow packet (a packet size is B) that arrives at the shared bandwidth package 0:

If B≤Tc—the purple waterline, the packet is sent to a sending queue, and Tc decreases by B.

If B>Tc—the purple waterline, the packet is discarded and Tc remains unchanged.

As shown in FIG. 10, for an arrived purple packet (a packet size is B):

If B≤Tc—the green waterline, the packet is sent to the sending queue, and Tc decreases by B.

If B>Tc—the green waterline, the packet is discarded and Tc remains unchanged.

As shown in FIG. 11, for an arrived green packet (a packet size is B):

If B≤Tc, the packet is sent to the sending queue, and Tc decreases by B.

If B>Tc, the packet is discarded and Tc remains unchanged.

Still refer to FIG. 6A and FIG. 6B. The following describes how the shared bandwidth package 0 processes a concurrent packet with reference to FIG. 6A and FIG. 6B.

It is assumed that at an initial moment (0 ms), the CBS bucket of the shared bandwidth package 0 is fully loaded with tokens, Tc is 5000, the purple waterline is 2500, and the green waterline is 500.

In the processing period of 0 ms to 1 ms:

It is assumed that the packet 1 in the intermediate queue 1 first arrives at the shared bandwidth package 0. Because the packet 1 is a green packet, according to the logic shown in FIG. 11, a size of the packet 1 is B=1500 bytes, where B≤Tc. Therefore, the packet 1 is sent to the sending queue 1, and Tc decreases by B.

In other words, Tc=5000−1500=3500.

It is assumed that the packet 1' in the intermediate queue 1' subsequently arrives at the shared bandwidth package 0. Because the packet 1' is a green packet, according to the logic shown in FIG. 11, a packet length of the packet 1' is B=1500 bytes, where B≤Tc=3500. Therefore, the packet 1' is sent to the sending queue 1', and Tc decreases by B.

In other words, Tc=3500−1500=2000.

Optionally, if the packet 1' first arrives at the shared bandwidth package, because the quantity Tc of tokens in the CBS bucket is large enough, a result of the packet 1' is the same as that in the foregoing case. In other words, both the packet 1 and the packet 1' may be sent to the corresponding sending queues, and are not discarded.

In the processing period of 1 ms to 2 ms:

Because neither the intermediate queue 1 nor the intermediate queue 1' has a packet in the processing period, rate limiting processing is not required.

In the processing period of 2 ms to 3 ms:

A quantity of newly added tokens in the CBS 0=the CIR 0×2 ms=2×10$^6$ bit/s×2×10$^3$s÷8=500.

The quantity Tc of tokens in the CBS 0 is 2000+500=2500.

It is assumed that the packet 3 in the intermediate queue 1 first arrives at the shared bandwidth package 0. Because the packet 3 is a purple packet, the rate limiting apparatus 1021 processes the packet 3 according to the logic shown in FIG. 10:

The packet length of the packet 3 is 1000 bytes. In this case, B=1000 bytes, and Tc—the green waterline=2500−500=2100.

In this case, B≤Tc—the green waterline, the packet 3 is sent to the sending queue 1, and Tc decreases by B. In other words, Tc=2500−1100=1400.

It is assumed that the packet 3' in the intermediate queue 1' subsequently arrives at the shared bandwidth package 0. Because the packet 3' is a yellow packet, the rate limiting apparatus 1021 processes the packet 3' according to the logic shown in FIG. 9. Tc—the purple waterline=2500−2500=0.

In this case, B>Tc—the purple waterline. Therefore, the packet 3' is discarded, and Tc=1400.

In an optional embodiment, it is assumed that the packet 3' in the intermediate queue 1' arrives at the shared bandwidth package 0 before the packet 3. Because the packet 3' is a yellow packet, the rate limiting apparatus 1021 processes the packet 3' according to the logic shown in FIG. 9. Tc—the purple waterline=2500−2500=0.

In this case, the packet length B=1000 bytes>Tc—the purple waterline. Therefore, the packet 3' is discarded, and Tc remains unchanged.

Subsequently, the packet 3 in the intermediate queue 1 arrives at the shared bandwidth package 0. Because the packet 3 is a purple packet, the rate limiting apparatus 1021 processes the packet 3 according to the logic shown in FIG. 10:

The packet length of the packet 3 is 1000 bytes. In this case, B=1000 bytes, and Tc—the green waterline=2500−500=2000.

In this case, B≤Tc—the green waterline, the packet 3 is sent to the sending queue 1, and Tc decreases by B. In other words, Tc=2500−1000=1500.

Therefore, in the total bandwidth package 0, waterlines of different priorities are set, to ensure that a packet having a higher priority can obtain more tokens than a packet having a lower priority. A yellow packet having the lower priority does not preempt all tokens in the CBS bucket of the shared bandwidth package 0 even if the yellow packet first arrives at the CBS bucket.

In the processing period of 3 ms to 4 ms:

Because neither the intermediate queue 1' nor the intermediate queue 1' has a packet in the processing period, rate limiting processing is not required.

In the processing period of 4 ms to 5 ms:

The quantity of newly added tokens in the CBS 0=the CIR $0 \times 2$ ms=$2 \times 10^6$ bit/s×$2 \times 10^3$ s÷8=500.

The quantity Tc of tokens in the CBS 0 is 1500+500=2000.

It is assumed that the packet 4 in the intermediate queue 1 first arrives at the shared bandwidth package 0. Because the packet 4 is a green packet, and B=900<Tc=2000, the packet 4 is sent by the rate limiting apparatus 1021 to the sending queue 4. A network interface card of the rate limiting apparatus 1021 may send a packet in the sending queue 1 to the internet, and the packet may arrive at a public network device 103.

In this case, a Tc value is updated: Tc=2000−900=1100.

It is assumed that the packet 4' in the intermediate queue 1' subsequently arrives at the shared bandwidth package 0. Because the packet 4' is a green packet, and B=900<Tc=1100, the packet 4' is sent by the rate limiting apparatus 1021 to the sending queue 4'. The rate limiting apparatus 1021 may send a packet in the sending queue 4' to the internet, and the packet may arrive at a public network device 104.

In this case, the Tc value is updated: Tc=1100−900=200.

Optionally, if the packet 4' first arrives at the shared bandwidth package 0, because the quantity Tc of the CBS bucket is large enough, a result of the packet 4' is the same as that in the foregoing case. In other words, both the packet 4 and the packet 4' may be sent to the corresponding sending queues, and are not discarded.

Figure 12:
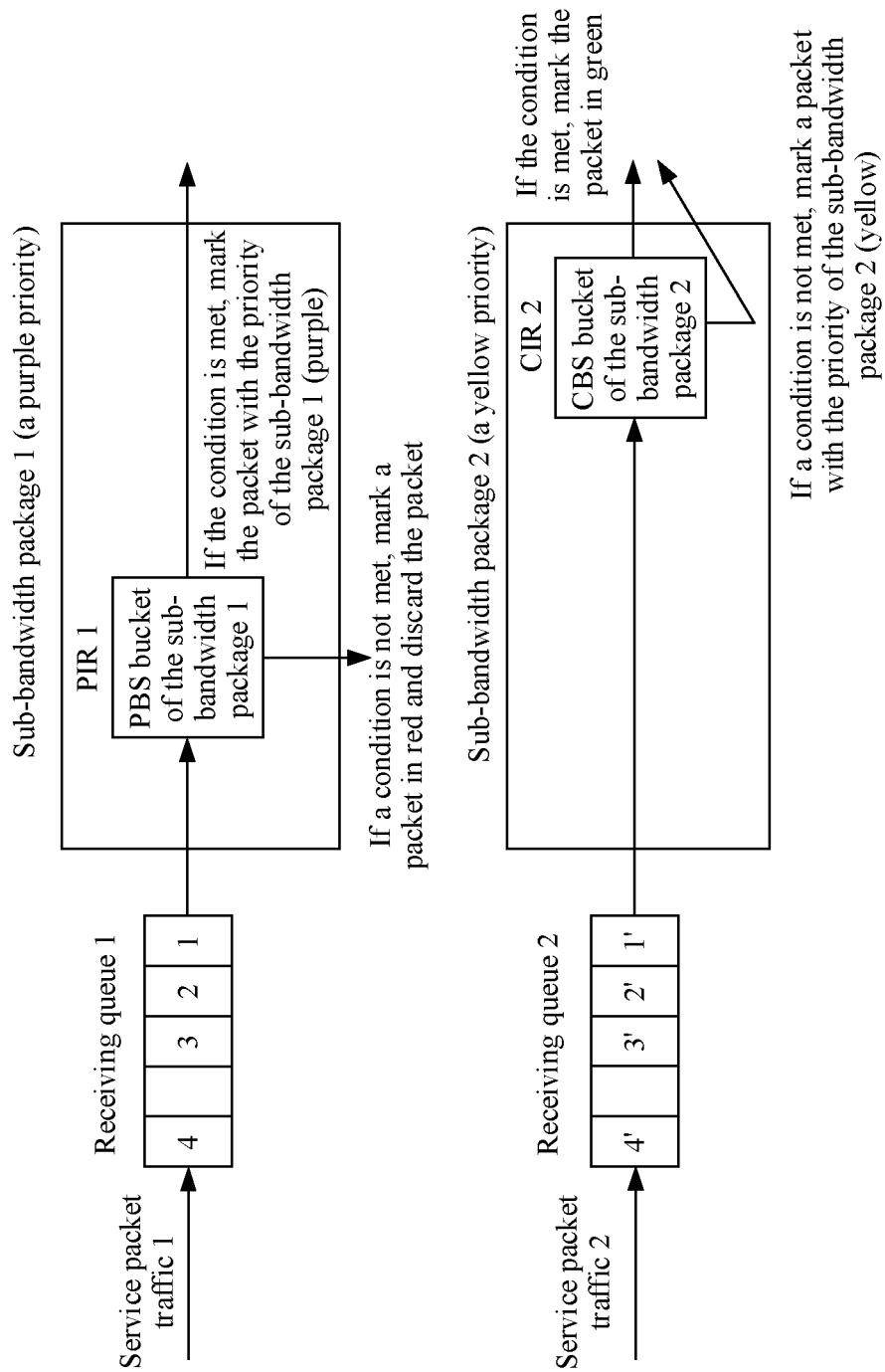
FIG. 12 is a diagram of another configuration manner of a sub-bandwidth package.

It should be noted that, when a sub-bandwidth package is configured on the interface shown in FIG. 2, minimum bandwidth may not be set, but maximum bandwidth may be reserved; or the maximum bandwidth is not set, but the minimum bandwidth is reserved. As shown in FIG. 12, FIG. 12 is a diagram of another configuration manner of the sub-bandwidth package. Processing logic on a shared bandwidth package 0 side remains unchanged, and corresponding processing is performed based on a packet priority that is determined based on the sub-bandwidth package 1 and the sub-bandwidth package 2.

Figure 13:
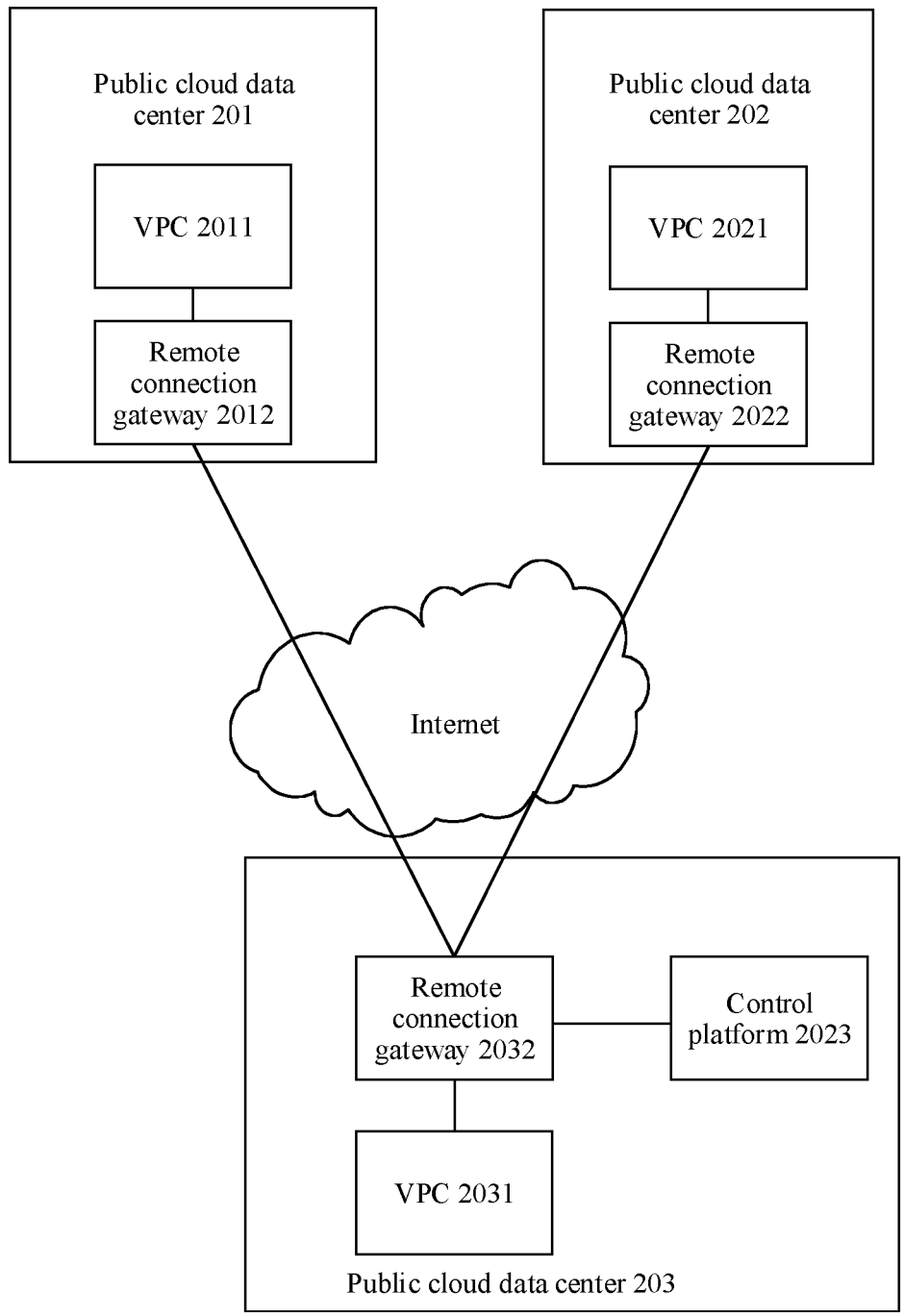
FIG. 13 is a diagram of another system structure of a rate limiting system according to an embodiment.

Further, refer to FIG. 13. FIG. 13 is a diagram of a rate limiting system according to an embodiment. As shown in FIG. 13, the rate limiting system includes public cloud data centers 201, 202, and 203 separately connected to the internet. The public cloud data centers 201, 202, and 203 are located in different regions. The public cloud data center 201 includes a VPC 2011, a remote connection gateway 2012, and a control platform 2023. The public cloud data center 202 includes a VPC 2021 and a remote connection gateway 2022. The public cloud data center 203 includes a VPC 2031 and a remote connection gateway 2032. The remote connection gateway 2032 establishes a remote tunnel connection with the remote connection gateway 2012. The remote connection gateway 2032 establishes a remote tunnel connection with the remote connection gateway 2022. In this embodiment, related functions of the foregoing rate limiting apparatus may be set in the remote connection gateway 2032. Rate limiting may be performed, through the remote connection gateway 2032, on packet traffic from the VPC 2031 to the VPC 2011 and packet traffic from the VPC 2031 to the VPC 2021.

The remote connection gateway may be, for example, a VPN gateway or a private line gateway.

A rate limiting apparatus 1021 identifies a source IP address of a received packet, and sends the packet to the foregoing receiving queue 1 when the source IP address of the packet is an IP address of the remote connection gateway 2012, or sends the packet to the foregoing receiving queue 2 when the source IP address of the packet is an IP address of the remote connection gateway 2022.

Optionally, the rate limiting apparatus 1021 identifies a destination IP address of the received packet, and sends the packet to the receiving queue 1 when the destination IP address of the packet is the IP address of the remote connection gateway 2012, or sends the packet to the receiving queue 2 when the destination IP address of the packet is the IP address of the remote connection gateway 2022.

Figure 14:
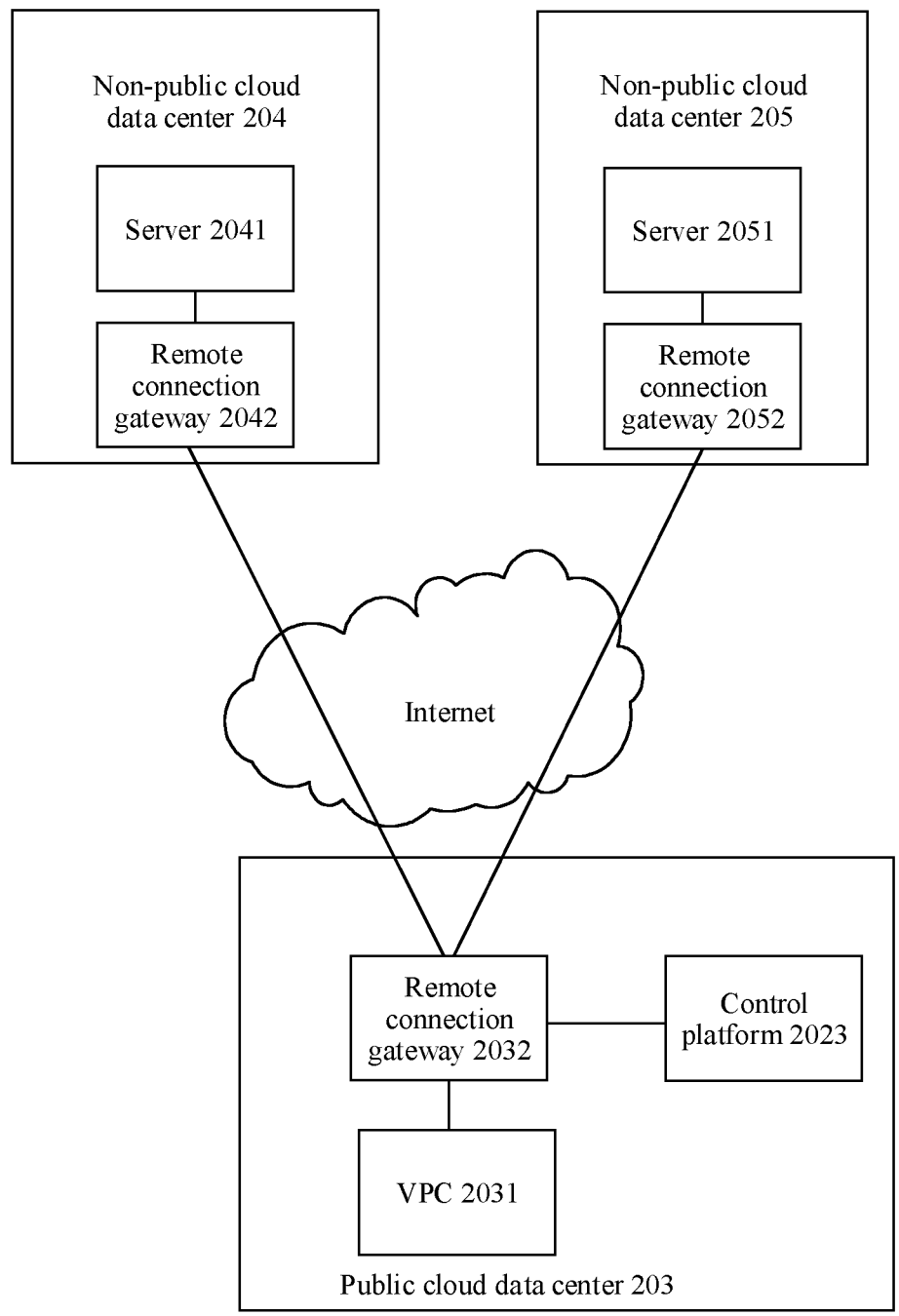
FIG. 14 is a diagram of a rate limiting system according to an embodiment.

Further, refer to FIG. 14. FIG. 14 is a diagram of a rate limiting system according to an embodiment. A difference from FIG. 13 lies in that a remote connection gateway 2032 establishes a remote tunnel connection with a remote connection gateway 2042 of a non-public cloud data center 204, and establishes a remote tunnel connection with a remote connection gateway 2052 of a non-public cloud data center 205. In this embodiment, related functions of the foregoing rate limiting apparatus may be set in the remote connection gateway 2032. Rate limiting may be performed, through the remote connection gateway 2032, on packet traffic from a VPC 2031 to a server 2041 and packet traffic from the VPC 2031 to a server 2051.

A rate limiting apparatus 1021 identifies a source IP address of a received packet, and sends the packet to the foregoing receiving queue 1 when the source IP address of the packet is an IP address of the remote connection gateway 2042, or sends the packet to the foregoing receiving queue 2 when the source IP address of the packet is an IP address of the remote connection gateway 2052.

Optionally, the rate limiting apparatus 1021 identifies a destination IP address of the received packet, and sends the packet to the receiving queue 1 when the destination IP address of the packet is the IP address of the remote connection gateway 2042, or sends the packet to the receiving queue 2 when the destination IP address of the packet is the IP address of the remote connection gateway 2052.

Optionally, the remote connection gateway 2032 may alternatively perform rate limiting on traffic of both the non-public cloud data center and a public cloud data center simultaneously. For example, the remote connection gateway 2032 may simultaneously establish a remote tunnel connection with the remote connection gateway 2012 shown in FIG. 13, and establish the remote tunnel connection with the remote connection gateway 2042 shown in FIG. 14, to separately perform rate limiting on traffic of a VPC 2011 from a public cloud data center 201 and traffic of the server 2041 from the non-public cloud data center 204.

Figure 15:
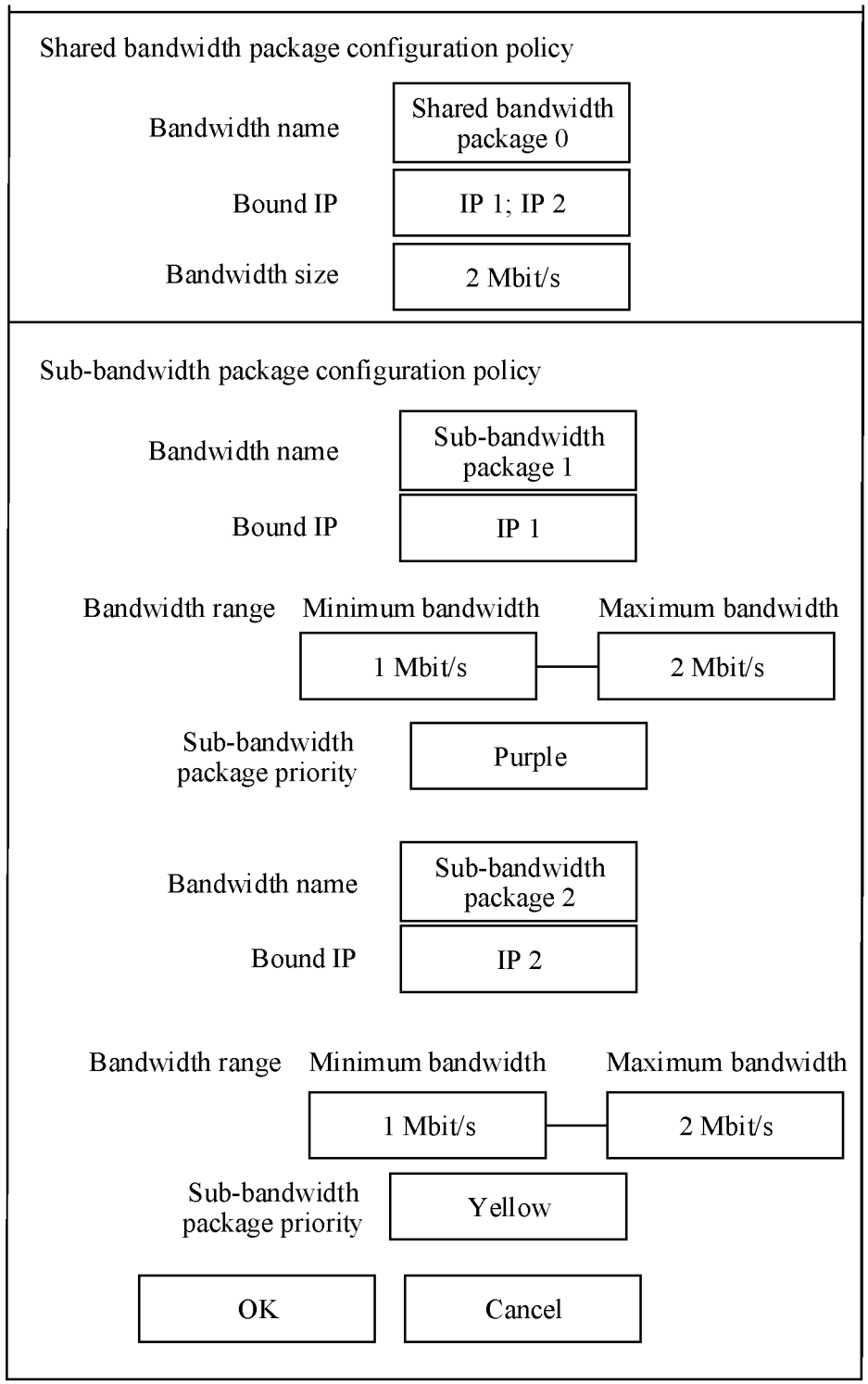
FIG. 15 is a diagram of a shared bandwidth package configuration interface of a control platform according to an embodiment.

It should be noted that, for the embodiments in FIG. 13 and FIG. 14, the control platform 2023 may provide a configuration interface similar to that in FIG. 2. For details, refer to FIG. 15. FIG. 15 is another diagram of a shared bandwidth package configuration interface of a control platform according to an embodiment. For the embodiment in FIG. 13, an IP 1 may be the IP address of the remote connection gateway 2012, and an IP 2 may be the IP address of the remote connection gateway 2022. For the embodiment in FIG. 14, the IP 1 may be the IP address of the remote connection gateway 2042, and the IP 2 may be the IP address of the remote connection gateway 2052.

Therefore, the rate limiting apparatus 1021 in the embodiments herein may implement rate limiting for different scenarios in which traffic rate limiting is involved on a public cloud, to ensure that different levels of rate limiting are performed, based on selections of a tenant, on traffic related to a public cloud device purchased by the tenant.

Figure 16:
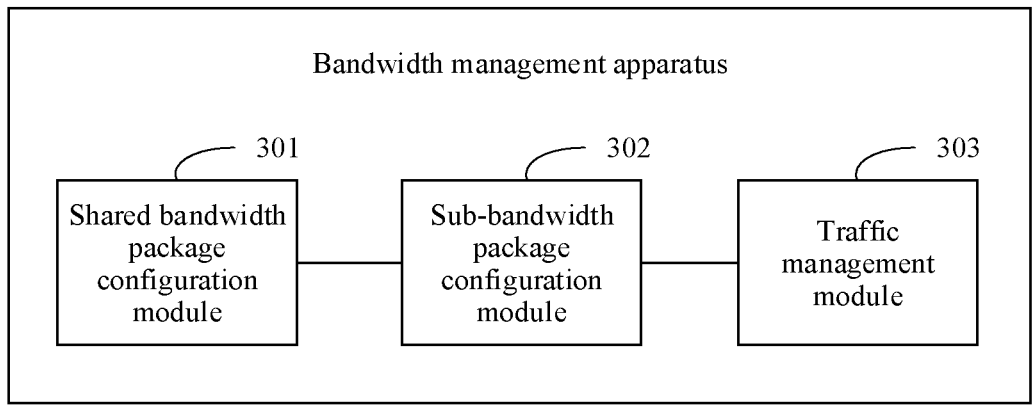
FIG. 16 is a diagram of a bandwidth management apparatus for a cloud service according to an embodiment.

FIG. 16 is a diagram of a bandwidth management apparatus for a cloud service according to an embodiment. As shown in FIG. 16, the bandwidth management apparatus includes a shared bandwidth package configuration module 301, a sub-bandwidth package configuration module 302, and a traffic management module 303. The shared bandwidth package configuration module 301 is configured to perform the step of creating and configuring the shared bandwidth package in step S103 in the embodiment shown in FIG. 4. The sub-bandwidth package configuration module 302 is configured to perform the step of creating and configuring the sub-bandwidth package in step S103 in the embodiment shown in FIG. 4. The traffic management module 303 is configured to perform step S106 in the embodiment shown in FIG. 4.

The bandwidth management apparatus may be disposed in the rate limiting apparatus 1021.

Figure 17:
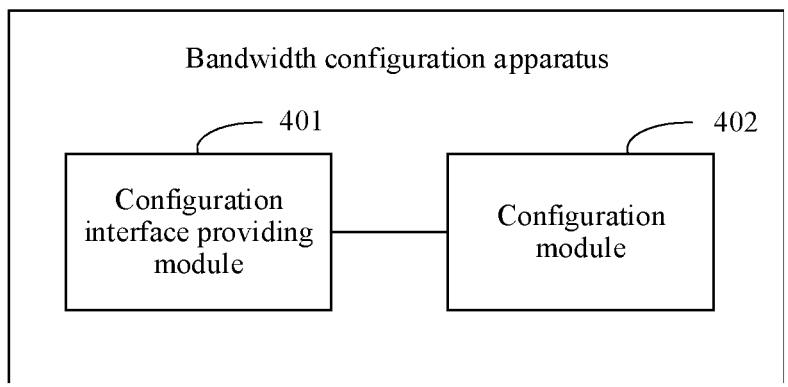
FIG. 17 is a diagram of a bandwidth configuration apparatus for a cloud service according to an embodiment.

FIG. 17 is a diagram of a bandwidth configuration apparatus for a cloud service according to an embodiment. As shown in FIG. 17, the bandwidth configuration apparatus includes a configuration interface providing module 401 and a configuration module 402. The configuration interface providing module 401 is configured to perform the step of providing the configuration interface in step S101 in the embodiment shown in FIG. 4. The configuration module 402 is configured to perform the step of obtaining the bandwidth package configuration policy in step S101 in the embodiment shown in FIG. 4.

The bandwidth configuration apparatus may be disposed in the control platform 1023.

Figure 18:
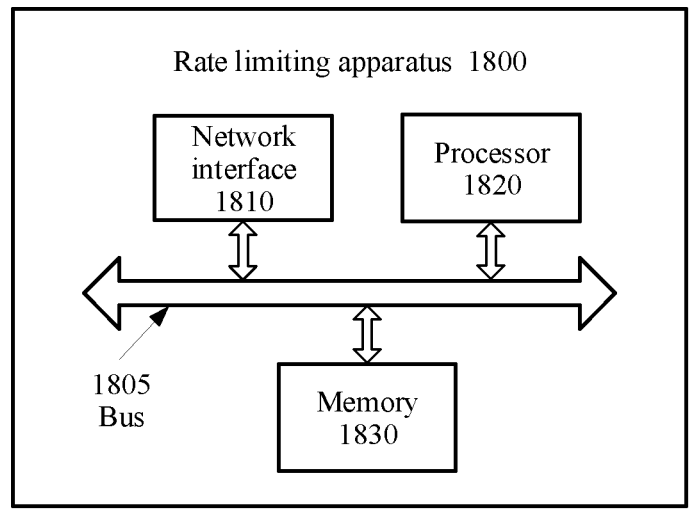
FIG. 18 is a diagram of a rate limiting apparatus according to an embodiment.

FIG. 18 is a diagram of a rate limiting apparatus 1800 according to an embodiment. As shown in FIG. 18, the rate limiting apparatus 1800 includes a network interface 1801, a memory 1806, and a processor 1804. The memory 1806 stores an instruction, and the processor 1804 runs the program instruction to perform the method performed by the rate limiting apparatus 1800 in the foregoing embodiments.

Figure 19:
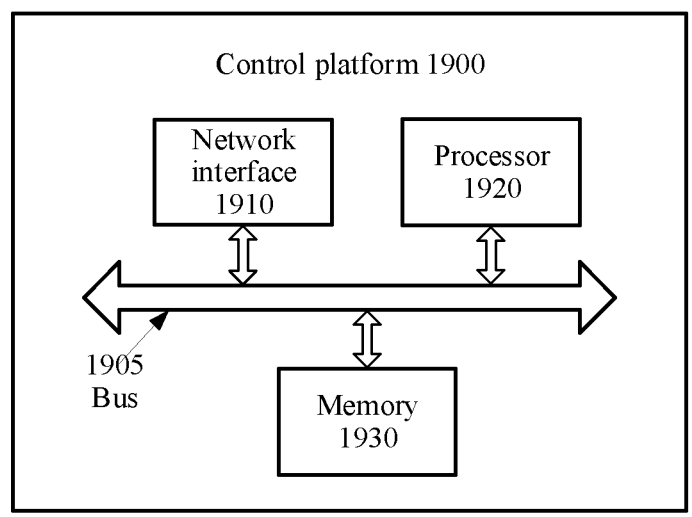
FIG. 19 is a diagram of a control platform according to an embodiment.

FIG. 19 is a diagram of a control platform 1900 according to an embodiment. As shown in FIG. 19, the control platform 1900 includes a network interface 1903, a memory 1909, and a processor 1905. The memory 1909 stores a program instruction, and the processor 1905 runs the program instruction to perform the method performed by the control platform 1900 in the foregoing embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a storage disk, or a magnetic tape), an optical medium (for example, a DVD), a semiconductor medium (for example, a solid-state storage drive (SSD)), or the like.

What is claimed is:

1. A bandwidth management method for a cloud service, comprising:
    configuring, by at least one computer, a shared bandwidth package for a tenant of the cloud service, at least two IP addresses sharing the shared bandwidth package, and the at least two IP addresses being configured by the tenant;
    configuring, by the at least one computer, at least one sub-bandwidth package of the shared bandwidth package, the at least one sub-bandwidth package being bound to at least one IP address; and
    performing, by the at least one computer, rate limiting management on packet traffic based on the at least one sub-bandwidth package and the shared bandwidth package.

2. The method according to claim 1, wherein the at least one sub-bandwidth package comprising multiple sub-bandwidth packages and wherein different sub-bandwidth packages of the multiple sub-bandwidth packages are bound to different IP addresses.

3. The method according to claim 1, wherein the performing, by the at least one computer, rate limiting management on packet traffic based on the at least one sub-bandwidth package and the shared bandwidth package comprises:
    for packet traffic corresponding to a particular IP address, performing, by the at least one computer, first-level rate limiting management based on a corresponding sub-bandwidth package bound to the particular IP address, and performing, by the at least one computer, second-level rate limiting management based on the shared bandwidth package.

4. The method according to claim 3, wherein the at least one sub-bandwidth package comprising multiple sub-bandwidth packages and wherein each sub-bandwidth package of the multiple sub-bandwidth packages comprises a peak parameter, and the first-level rate limiting management comprises:
obtaining, by the at least one computer, a first packet and a second packet, wherein IP addresses of the first packet and the second packet are bound to a first sub-bandwidth package; and
based on a peak parameter of the first sub-bandwidth package, discarding, by the at least one computer, the first packet and allowing the second packet to pass through, wherein a size of the first packet is greater than a first threshold, a size of the second packet is less than or equal to the first threshold, and the first threshold is determined based on the peak parameter of the first sub-bandwidth package.

5. The method according to claim 4, wherein the each sub-bandwidth package further comprises an assurance parameter, and before the allowing the second packet to pass through, the method further comprises:
adding, by the at least one computer, a priority label to the second packet based on the size of the second packet, wherein when the size of the second packet is less than or equal to a second threshold, a highest priority label is added to the second packet, and when the size of the second packet is greater than the second threshold, a second highest priority label is added to the second packet, the second threshold being determined based on an assurance parameter of the first sub-bandwidth package.

6. The method according to claim 5, wherein the shared bandwidth package comprises a first waterline and a second waterline, and a quantity of tokens corresponding to the first waterline is greater than a quantity of tokens corresponding to the second waterline; and
the second-level rate limiting management comprises:
performing, by the at least one computer, rate limiting management based on a priority label of a packet, wherein a packet having the highest priority label obtains a token within a range of the first waterline, and a packet having the second highest priority label obtains a token within a range of the second waterline.

7. The method according to claim 5, wherein the each sub-bandwidth package further comprises priority information, and the priority information the of each sub-bandwidth package is used to indicate a contention priority, in the shared bandwidth package, of a packet corresponding to the IP address bound to the each sub-bandwidth package;
the shared bandwidth package comprises at least three waterlines, wherein a first waterline corresponds to a largest quantity of tokens, and a third waterline corresponds to a smallest quantity of tokens; and
the second-level rate limiting management comprises:
performing, by the at least one computer, rate limiting management based on a priority label of a packet, wherein a packet having a highest priority label obtains a token within a range of the first waterline, a packet having a second highest priority label and a high contention priority obtains a token within a range of the second waterline, and a packet having the second highest priority label and a low contention priority obtains a token within a range of the third waterline.

8. The method according to claim 1, wherein the at least two IP addresses are at least two public IP addresses, the at least two public IP addresses are purchased by the tenant from a control platform that provides the cloud service, and the at least two public IP addresses are separately bound to one public cloud device purchased by the tenant from the control platform.

9. The method according to claim 1, wherein the at least two IP addresses are IP addresses of at least two remote connection gateways, and the at least two remote connection gateways are disposed in a non-public cloud data center.

10. The method according to claim 1, wherein the at least two IP addresses are IP addresses of at least two remote connection gateways, and the at least two remote connection gateways are disposed in a remote public cloud data center.

11. A rate limiting apparatus, comprising:
a memory storing instructions; and
at least one processor in communication with the network interface and the memory, the at least one processor configured, upon execution of the instructions, to perform the following steps:
configure a shared bandwidth package for a tenant of the cloud service, at least two IP addresses sharing the shared bandwidth package, and the at least two IP addresses being configured by the tenant;
configure at least one sub-bandwidth package of the shared bandwidth package, the at least one sub-bandwidth package being bound to at least one IP address; and
perform rate limiting management on packet traffic based on the at least one sub-bandwidth package and the shared bandwidth package.

12. The apparatus according to claim 11, wherein the at least one sub-bandwidth package comprising multiple sub-bandwidth packages and wherein different sub-bandwidth packages of the multiple sub-bandwidth packages are bound to different IP addresses.

13. The apparatus according to claim 11, wherein the processor runs the program instruction to:
for packet traffic corresponding to each IP address, perform first-level rate limiting management based on a corresponding sub-bandwidth package bound to the particular IP address, and perform second-level rate limiting management based on the shared bandwidth package.

14. The apparatus according to claim 13, wherein the at least one sub-bandwidth package comprising multiple sub-bandwidth packages and wherein each sub-bandwidth package of the multiple sub-bandwidth packages comprises a peak parameter, and the processor runs the program instruction to:
obtain a first packet and a second packet, wherein IP addresses of the first packet and the second packet are bound to a first sub-bandwidth package; and
based on a peak parameter of the first sub-bandwidth package, discard the first packet and allowing the second packet to pass through, wherein a size of the first packet is greater than a first threshold, a size of the second packet is less than or equal to the first threshold, and the first threshold is determined based on the peak parameter of the first sub-bandwidth package.

15. The apparatus according to claim 14, wherein each sub-bandwidth package further comprises an assurance parameter, and before the allowing the second packet to pass through, the processor runs the program instruction to:
add a priority label to the second packet based on the size of the second packet, wherein when the size of the second packet is less than or equal to a second threshold, a highest priority label is added to the second packet, when the size of the second packet is greater than the second threshold, a second highest priority label is added to the second packet, and the second threshold is determined based on an assurance parameter of the first sub-bandwidth package.

16. The apparatus according to claim 15, wherein the shared bandwidth package comprises a first waterline and a second waterline, and a quantity of tokens corresponding to the first waterline is greater than a quantity of tokens corresponding to the second waterline; and the processor runs the program instruction to:

perform rate limiting management based on a priority label of a packet in the second-level rate limiting management, wherein a packet having the highest priority label obtains a token within a range of the first waterline, and a packet having the second highest priority label obtains a token within a range of the second waterline.

17. The apparatus according to claim 15, wherein the each sub-bandwidth package further comprises priority information, and the priority information of the each sub-bandwidth package is used to indicate a contention priority, in the shared bandwidth package, of a packet corresponding to the IP address bound to the each sub-bandwidth package;

the shared bandwidth package comprises at least three waterlines, wherein a first waterline corresponds to a largest quantity of tokens, and a third waterline corresponds to a smallest quantity of tokens; and the processor runs the program instruction to:

perform rate limiting management based on a priority label of a packet in the second-level rate limiting management, wherein a packet having a highest priority label obtains a token within a range of the first waterline, a packet having a second highest priority label and a high contention priority obtains a token within a range of the second waterline, and a packet having the second highest priority label and a low contention priority obtains a token within a range of the third waterline.

18. The apparatus according to claim 11, wherein the at least two IP addresses are at least two public IP addresses, the at least two public IP addresses are purchased by the tenant from a control platform that provides the cloud service, and the at least two public IP addresses are separately bound to one public cloud device purchased by the tenant from the control platform.

19. The apparatus according to claim 11, wherein the at least two IP addresses are IP addresses of at least two remote connection gateways, and the at least two remote connection gateways are disposed in a non-public cloud data center.

20. The apparatus according to claim 11, wherein the at least two IP addresses are IP addresses of at least two remote connection gateways, and the at least two remote connection gateways are disposed in a remote public cloud data center.

* * * * *